(12) United States Patent
Lee

(10) Patent No.: US 8,953,262 B2
(45) Date of Patent: Feb. 10, 2015

(54) IMAGING LENS

(71) Applicant: Genius Electronic Optical Co., Ltd., Taichung (TW)

(72) Inventor: Poche Lee, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 43 days.

(21) Appl. No.: 13/757,643

(22) Filed: Feb. 1, 2013

(65) Prior Publication Data

US 2014/0218597 A1     Aug. 7, 2014

(30) Foreign Application Priority Data

Oct. 31, 2012 (TW) .............................. 101140351 A

(51) Int. Cl.
    *G02B 9/60*         (2006.01)
    *G02B 13/00*      (2006.01)

(52) U.S. Cl.
    CPC .............. *G02B 13/0045* (2013.01); *G02B 9/60* (2013.01)
    USPC .......................................................... 359/763

(58) Field of Classification Search
    CPC ........................................................ G02B 9/60
    USPC ................................................. 359/763–770
    See application file for complete search history.

(56) References Cited

U.S. PATENT DOCUMENTS

| | | |
|---|---|---|
| 2,445,594 A | 7/1948 | Bennett |
| 3,936,153 A | 2/1976 | Ogura |
| 4,606,607 A | 8/1986 | Kurihara |
| 4,674,844 A | 6/1987 | Nishioka et al. |
| 5,966,251 A | 10/1999 | Nagahara |
| 6,043,941 A | 3/2000 | Yamada |
| 6,476,982 B1 | 11/2002 | Kawakami |
| 6,650,486 B2 | 11/2003 | Chen |
| 6,728,047 B2 | 4/2004 | Sato |
| 6,891,683 B2 | 5/2005 | Schuster |
| 6,917,479 B2 | 7/2005 | Park |
| 6,940,661 B2 | 9/2005 | Chen |

(Continued)

FOREIGN PATENT DOCUMENTS

| | | |
|---|---|---|
| CN | 101819315 A | 1/2010 |
| JP | 2003-094150 | 10/2004 |

(Continued)

OTHER PUBLICATIONS

Office Action mailed Oct. 2, 2013 in U.S. Appl. No. 13/757,634, 7 pages.

(Continued)

*Primary Examiner* — Darryl J Collins
(74) *Attorney, Agent, or Firm* — Kilpatrick Townsend & Stockton LLP

(57) ABSTRACT

A five element lens system for use with an imaging sensor includes first, second, third, fourth, and fifth lens elements and an optical filter that are arranged sequentially in order from an object side to an imaging side. The lens elements are coated with an anti-reflective film. The lens system further includes an optical filter that is disposed at a distance from the imaging sensor. The lens elements are relatively positioned to each other to satisfy specific conditions. The lens elements further include thickness to diameters ratios that satisfy specific conditions. The lens system is capable of focusing images of objects located from a range of 10 cm to infinity from the lens system.

24 Claims, 5 Drawing Sheets

(56) References Cited

U.S. PATENT DOCUMENTS

| | | |
|---|---|---|
| 6,950,246 B2 | 9/2005 | Amanai |
| 6,985,306 B2 | 1/2006 | Abe |
| 7,012,765 B2 | 3/2006 | Matsui |
| 7,035,023 B2 | 4/2006 | Nanba |
| 7,061,694 B2 | 6/2006 | Amanai |
| 7,154,683 B1 * | 12/2006 | Volk ............................. 359/769 |
| 7,274,518 B1 | 9/2007 | Tang |
| 7,295,386 B2 | 11/2007 | Taniyama |
| 7,345,830 B2 | 3/2008 | Shinohara |
| 7,365,920 B2 | 4/2008 | Noda |
| 7,453,654 B2 | 11/2008 | Shinohara |
| 7,535,658 B2 | 5/2009 | Taniyama |
| 7,826,151 B2 | 11/2010 | Tsai |
| 7,864,454 B1 | 1/2011 | Tang |
| 7,911,711 B1 | 3/2011 | Tang |
| 8,000,031 B1 | 8/2011 | Tsai |
| 8,072,695 B1 | 12/2011 | Lee et al. |
| 8,179,613 B2 | 5/2012 | Sano |
| 8,189,273 B2 | 5/2012 | Noda |
| 8,233,224 B2 | 7/2012 | Chen |
| 8,310,768 B2 | 11/2012 | Lin |
| 8,325,429 B2 | 12/2012 | Tang |
| 8,395,691 B2 | 3/2013 | Tang |
| 8,400,716 B2 | 3/2013 | Jeong |
| 8,537,473 B2 | 9/2013 | Yin |
| 8,711,491 B2 * | 4/2014 | Chang et al. .................. 359/714 |
| 2002/0181121 A1 | 12/2002 | Kawakami |
| 2003/0184883 A1 | 10/2003 | Sato |
| 2004/0240080 A1 | 12/2004 | Matsui et al. |
| 2005/0030645 A1 | 2/2005 | Do |
| 2006/0056068 A1 | 3/2006 | Lee |
| 2006/0238898 A1 | 10/2006 | Shinohara |
| 2007/0146901 A1 | 6/2007 | Noda |
| 2007/0229984 A1 | 10/2007 | Shinohara |
| 2007/0236811 A1 | 10/2007 | Mori |
| 2008/0180817 A1 | 7/2008 | Taniyama |
| 2010/0220229 A1 * | 9/2010 | Sano ............................. 348/340 |
| 2011/0134305 A1 * | 6/2011 | Sano et al. .................... 348/340 |
| 2012/0092544 A1 | 4/2012 | Noda |
| 2012/0147482 A1 | 6/2012 | Tsai |
| 2012/0262806 A1 | 10/2012 | Huang |
| 2013/0038947 A1 | 2/2013 | Tsai |
| 2013/0100542 A1 | 4/2013 | Tsai |

FOREIGN PATENT DOCUMENTS

| | | |
|---|---|---|
| JP | 2003-168780 | 1/2005 |
| JP | 2003-168781 | 1/2005 |
| JP | 2003-186642 | 1/2005 |
| JP | 2003-402783 | 6/2005 |
| JP | 2009-294527 A | 12/2009 |
| TW | 201227044 A | 7/2012 |
| WO | 2010024198 A1 | 3/2010 |

OTHER PUBLICATIONS

Office Action for corresponding Japanese Patent Application No. 201210426911.1 dated Sep. 1, 2014, 5 pages (no English Translation available).

* cited by examiner ures of each lens element can be coated with an anti-reflective coating.

IMAGING LENS

BACKGROUND

The present disclosure relates to an imaging lens and an imaging lens system having the same, more particularly to an imaging lens with five lens elements and to an imaging lens system having the same.

In recent years, various electronic devices have been designed to include imaging lenses and imaging sensors for image-capturing and video-recording capabilities. To improve portability and imaging performance while reducing dimensions and weights of the electronic devices, different combinations of lenses are installed in electronic devices that have embedded charge coupled device (CCD) sensors or complementary metal oxide semiconductor (CMOS) imaging sensors. There is thus a need for compact imaging lenses and imaging lens systems that provide improved image quality. Compactness in a lens system is determined by the size of the clear aperture diameters of the lens elements in the lens system. In the description below, the diameter of a lens element is referred to its clear aperture diameter for the sake of brevity.

U.S. Pat. No. 8,072,695 discloses imaging lenses with five lens elements. Each of the imaging lenses has a unique combination and arrangement of lens elements with different surface shapes to thereby achieve a specific combination of optical characteristics. However, in achieving the specific combination of optical characteristics, certain aspects of optical performance are compromised. Therefore, the need to develop other imaging lenses with better combinations of optical characteristics still exists in the market.

SUMMARY

Embodiments of the present invention provide imaging lenses and systems with a desired combination of optical characteristics.

According to an embodiment of the present invention, an imaging lens includes first, second, third, fourth, and fifth lens elements arranged sequentially in order from an object side to an imaging side, each of the first, second, third, fourth, and fifth lens elements having an object-side surface facing toward the object side, and an imaging-side surface facing toward the imaging side. The imaging lens satisfies the conditions of $20<vd1-vd2$, $0\le|vd3-vd2|\le5$, $20<vd4-vd3$, and $0\le|vd4-vd5|\le5$, wherein vd1, vd2, vd3, vd4, and vd5 are Abbe numbers of the first, second, third, fourth, and fifth lens elements, respectively.

According to another embodiment of the present invention, an imaging lens system has in order from an object side to an imaging side an aperture stop, a first lens element, a second lens element, a third lens element, a fourth lens element, and a fifth lens element arranged behind the aperture stop in sequence. Each lens element has an object-side diameter and an imaging-side diameter. The object-side diameter may be equal to or smaller than the imaging-side diameter. The aperture stop is configured to pass light and may have a circular-shaped opening. The circular-shaped opening has a diameter that may be equal to or smaller than the object-side diameter of the first lens element. The first lens element has a first Abbe number and the second lens element has a second Abbe number. The first Abbe number is greater than the second Abbe number by at least 20. The object-side and imaging-side surfaces of each lens element can be coated with an anti-reflective coating.

According to yet another embodiment of the present invention, a lens system includes first, second, third, fourth, and fifth lens elements that are arranged in order from an object side to an imaging side. The five lens elements are sequentially arranged on an optical axis. The lens system further includes an optical filter disposed between the fifth lens element and the imaging sensor along the optical axis. Each of the first, second, third, fourth and fifth lens elements has an object-side surface facing toward the object side, and an imaging-side surface facing toward the imaging side. The optical filter has an object-side surface and disposed at a distance of about 0.441 mm from the imaging-side of the fifth lens element. In an embodiment, the imaging-side surface of the first lens element and the object-side surface of the second lens element have an air gap of 0.070 mm, the imaging-side surface of the second lens element and the object-side surface of the third lens element have an air gap of 0.288 mm, the imaging-side surface of the third lens element and the object-side surface of the fourth lens element has an air gap of 0.260 mm, and the imaging-side surface of the fourth lens element and the object-side surface of the fifth lens element has an air gap of 0.131 mm. In an embodiment, the first lens element may have a thickness of 0.49 mm, the second lens element may have a thickness of 0.27 mm, the third lens element may have a thickness of 0.465 mm, the fourth lens element may have a thickness of 0.4 mm, and the fifth lens element may have a thickness of 0.35 mm. In an embodiment, the optical filter may have a thickness of 0.3 mm and may be disposed at a distance about 0.441 mm of the imaging-side surface of the fifth lens element.

The following detailed description together with the accompanying drawings will provide a better understanding of the nature and advantages of the present invention.

DETAILED DESCRIPTION

Figure 1:
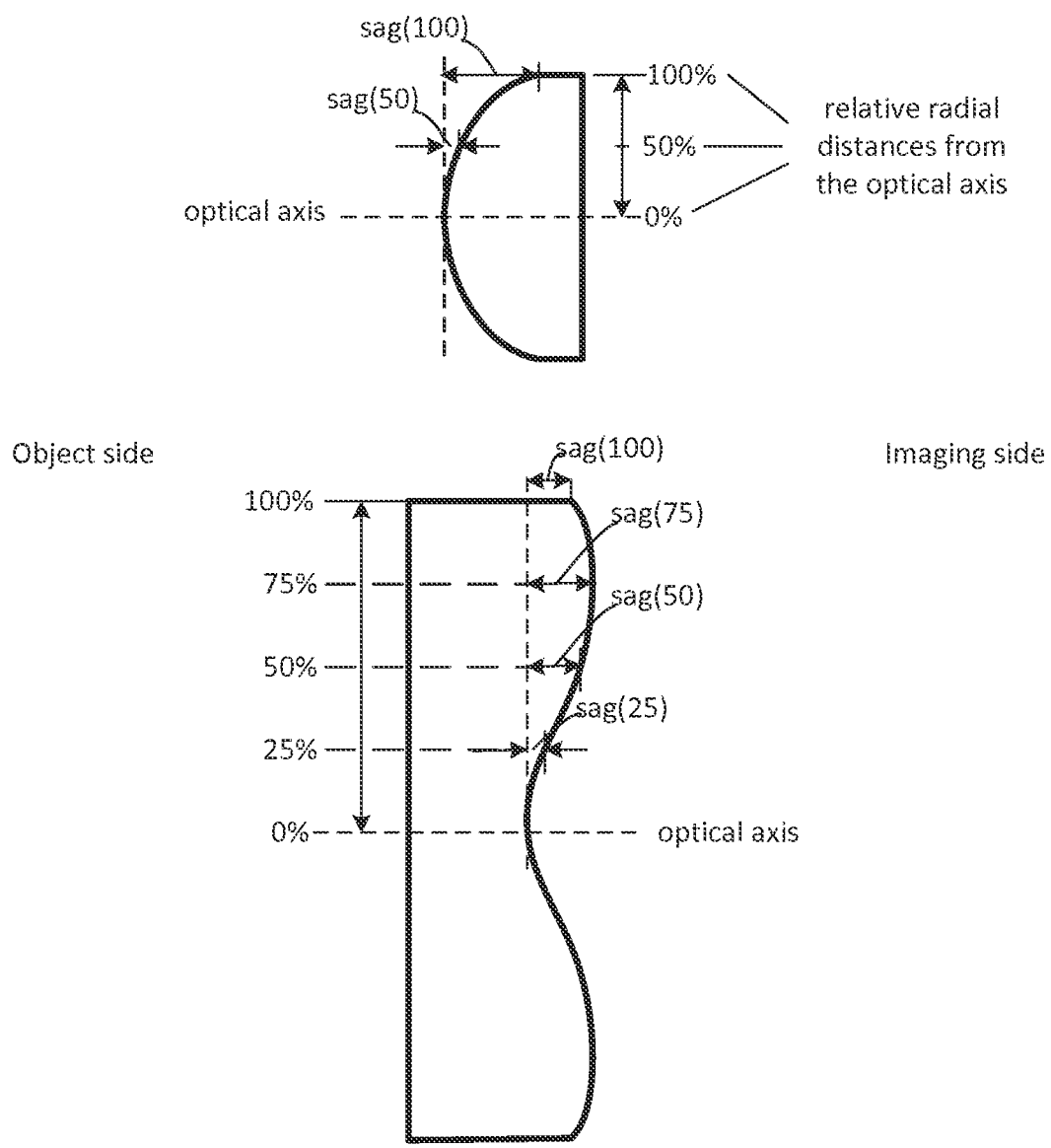
FIG. 1 is a schematic diagram illustrating some terms used in the present description.

The term "lens" or "lens system" will be used to describe a complete lens that may include multiple lens elements, an aperture stop, optical filter, and the like. The term "lens element" is herein defined as a single transparent mass of refractive material having two opposed refracting surfaces. The term "diameter" refers to the "clear aperture" or "clear aperture diameter" of a lens element. The term "clear aperture", "clear aperture diameter," and "diameter" will be interchangeably used throughout the specification. The term "total track length" or "TTL" is defined as a distance from an object-side surface of the first lens element to an imaging plane. The term "focal length" is defined as the distance from the optical center of the lens to the focal point that is located on an imaging sensor. A "sag" is the displacement of the surface of the lens from a reference plane transverse (perpendicular) to the optical axis and can be measured at different radial distances from the optical axis. FIG. 1 shows an example of two different lens elements having different sag values at the 25 percent point, 50 percent point, 75 percent point, and at the 100 percent point from the optical axis, where the percentages are relative to the radius of the lens in the plane perpendicular to the optical axis. The radius is defined as one-half of the clear aperture diameter of a lens element. Since the lens elements described herein are rotationally symmetric about the optical axis, the lower half is a mirror image of the upper half. The sag value can be zero, positive, or negative depending on the surface shape of the lens element and whether the surface is an object-side or imaging side surface. In the example shown in FIG. 1, the sag values are positive.

Figure 2:
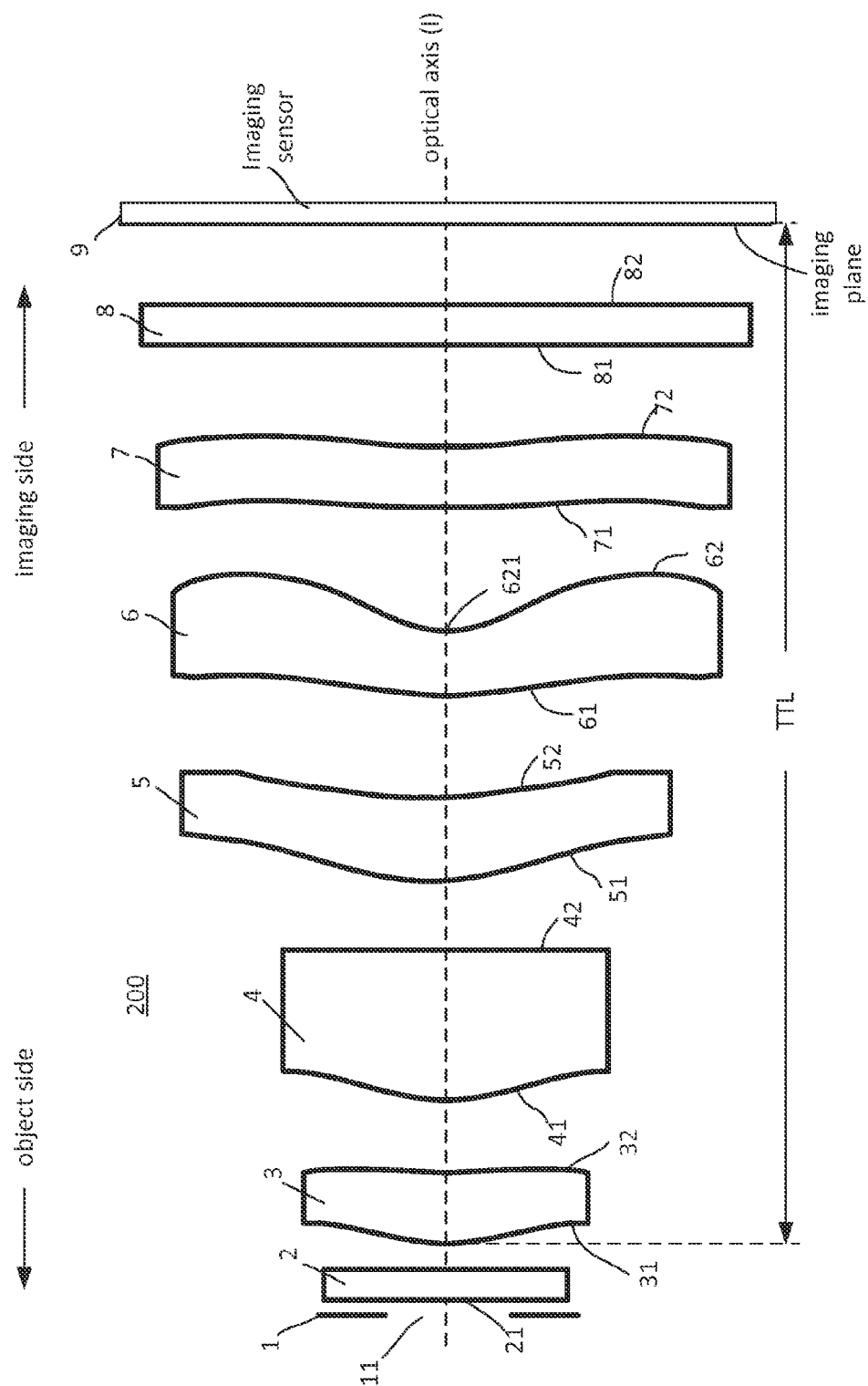
FIG. 2 is a schematic diagram defining certain characteristics of an imaging lens system according to the present invention.

Referring to FIG. 2, an imaging lens system 200, according to an embodiment of the present invention, may include a cover glass or window 2, first, second, third, fourth and fifth lens elements 3, 4, 5, 6, 7, and an optical filter 8 arranged in the given order from an object side to an imaging side. Each of the first, second, third, fourth, and fifth lens elements 3, 4, 5, 6, 7 has an object-side surface 31, 41, 51, 61, 71, facing toward the object side, and an imaging-side surface 32, 42, 52, 62, 72 facing toward the imaging side. In some embodiments, aperture stop 1 may be disposed at object-side surface 21 of cover glass or window 2. When light from a target object enters imaging lens system 200, it passes through aperture stop 1, cover glass or window 2, lens elements 3 through 7, and optical filter 8 in the given order, and forms an image at an imaging plane 9 which may be a surface of an imaging sensor.

In some embodiments, aperture stop 1 is made of an opaque material. A central opening 11 through aperture stop 1 may be circular shaped and have a diameter that is smaller than the diameter of the object-side surface 31 of the first lens element. In an exemplary embodiment, the diameter of the aperture stop is about 1.36 mm and the diameter of object-side surface 31 of the first lens element is about 1.377 mm. In another embodiment, aperture stop 1 may be disposed between cover glass 2 and object-side surface 31 of the first lens element 3.

Each lens element has two shaped surfaces that converge or diverge light. Each lens element is made out of an optically transparent material, such as glass or plastic. The refractive index of the lens material and curvature of the shaped surface define the light refraction. The surface curvature of each lens element can be defined by a set of sag values. In an embodiment, the set of sag values of each lens element can be provided in a table format to a computer database for manufacturing a lens element.

Referring still to FIG. 2, optical filter 8 has an object-side surface 81 facing toward the object side, and an imaging-side surface 82 facing toward the imaging side. In some embodiments, the optical filter may be an infrared filter that passes light having a wavelength lower than 0.8 microns and suppresses transmission of light having wavelengths greater than 0.8 microns. Each of the five lens elements may have a refractive index greater than 1.5. In some embodiments, the object-side surface and the imaging-side surface of the first, second, third, fourth and fifth lens elements are coated with an anti-reflective coating.

Figure 3:
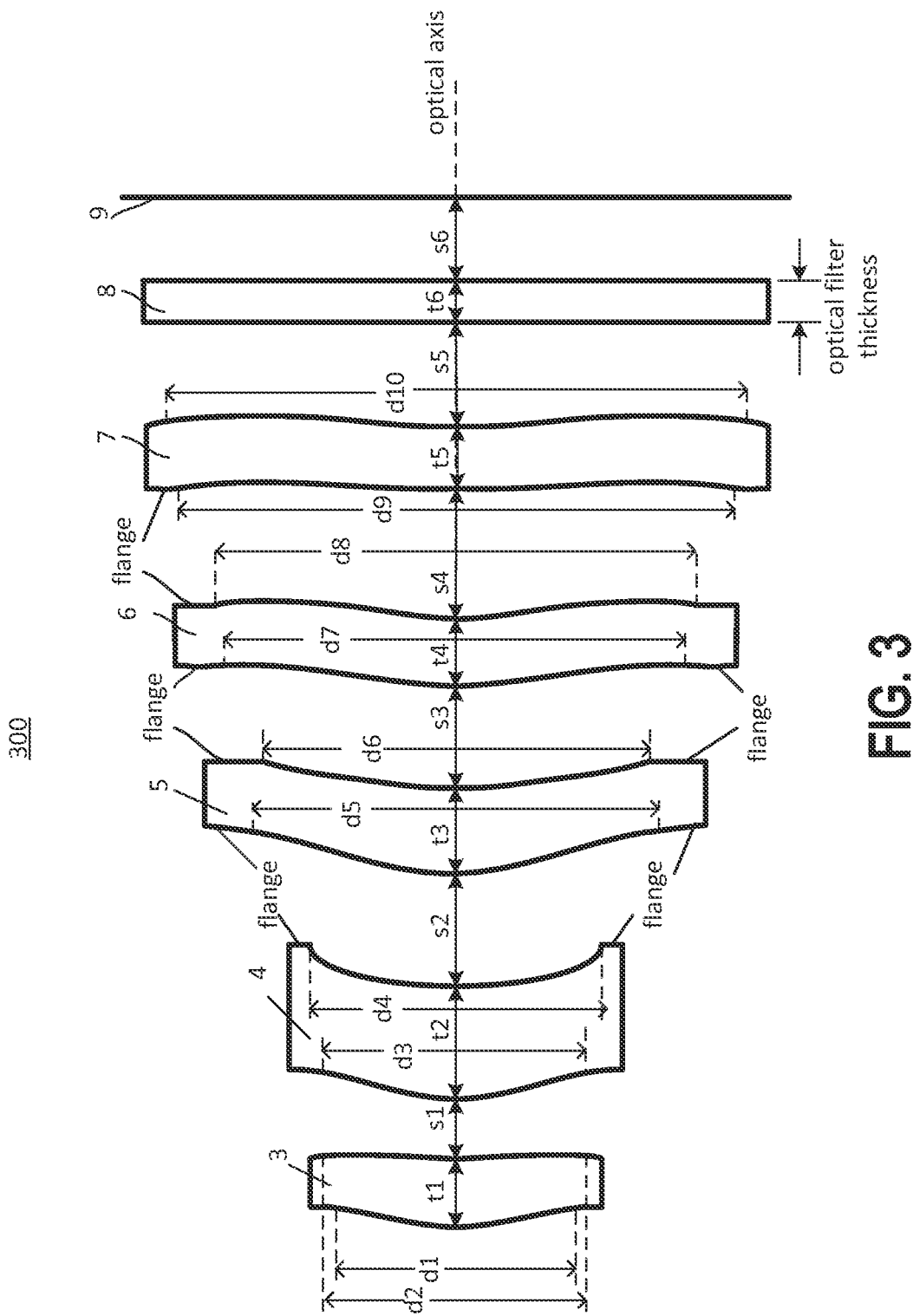
FIG. 3 is a schematic diagram defining certain characteristics of an imaging lens system according to the present invention.

In some embodiments, the relative position of the lens elements to each other, the diameter to thickness ratio of each lens element, the ratio between the sum of the air gaps and the total track length are factors in achieving good optical performance. In some embodiments an air gap between the lens elements is needed to facilitate proper focusing of incident light. Referring to FIG. 3, s1 is an air gap between the imaging-side surface of the first lens element and the object-side surface of the second lens element, s2 is an air gap between the imaging-side surface of the second lens element and the object-side surface of the third lens element, s3 is an air gap between the imaging-side surface of the third lens element and the object-side surface of the fourth lens element, s4 is an air gap between the imaging-side surface of the fourth lens element and the object-side surface of the fifth lens element, and s5 is an air gap between the imaging-side surface of the fifth lens element and the object-side surface of the optical filter. Additionally, imaging plane 9 is placed at a distance s6 from the imaging-side of optical filter 8, as shown in FIG. 3. If the imaging plane is placed at a distance larger than 0.4 mm from the optical filter, the imaging sensor may generate an inaccurate image due to possible loss of light with a given chief ray angle (CRA). In an embodiment, the chief ray angle is less than 31 degrees.

Referring still to FIG. 3, t1 is a thickness of first lens element 3 that is measured from the object-side surface at the optical axis to the imaging-side surface at the optical axis. Similarly, t2 is a thickness of second lens element 4 measured at the optical axis, t3 is a thickness of third lens element 5 measured at the optical axis, t4 is a thickness of fourth lens element 6 measured at the optical axis, and t5 is a thickness of fifth lens element 7 measured at the optical axis. Each lens element may have one or more flanges formed around its periphery and extending outwardly away from the optical axis. The flanges may be used to mount the lens element to a holding member (not shown). The effective diameter (i.e., the "clear aperture" or "clear aperture diameter") of the object-side surface of first lens element 3 is designated d1, and the effective diameter of the imaging-side surface of first lens element 3 is designated d2. The effective diameter is defined as the diameter of the surface of the lens element that may contribute to the optical performance of the lens element. In other words, the effective diameter may not include the flange at the outer periphery of the lens element. Hereinafter, the effective diameter is referred to as the diameter. Similarly, the diameter of the object-side surface of second lens element 4 is designated d3, and the diameter of the imaging-side surface of second lens element 4 is designated d4; the diameter of the object-side surface of third lens element 5 is designated d5, and the diameter of the imaging-side surface of third lens element 5 is designated d6; the diameter of the object-side surface of fourth lens element 6 is designated d7, and the diameter of the imaging-side surface of fourth lens element 6 is designated d8. Likewise, the diameter of the object-side surface of fifth lens element 7 is designated d9, and the diameter of the imaging-side surface of fifth lens element 7 is designated d10.

Table 1 provides design parameters of a lens system according to an embodiment of the present invention.

TABLE 1

| lens | Refractive index | Thickness (mm) | Air gap (mm) | Diameter (mm) |
|---|---|---|---|---|
| first | 1.54 | t1 = 0.490 | s1 = 0.070 | d1 = 1.377 |
|  |  |  |  | d2 = 1.393 |
| second | 1.65 | t2 = 0.270 | s2 = 0.288 | d3 = 1.388 |
|  |  |  |  | d4 = 1.390 |
| third | 1.54 | t3 = 0.465 | s3 = 0.260 | d5 = 1.494 |
|  |  |  |  | d6 = 1.906 |

TABLE 1-continued

| lens | Refractive index | Thickness (mm) | Air gap (mm) | Diameter (mm) |
|---|---|---|---|---|
| fourth | 1.54 | t4 = 0.400 | s4 = 0.131 | d7 = 2.078 |
|  |  |  |  | d8 = 2.431 |
| fifth | 1.53 | t5 = 0.350 | s5 = 0.441 | d9 = 2.870 |
|  |  |  |  | d10 = 3.402 |

Referring to Table 1 and FIG. 3, the thickness of the lens element is measured from the object-side surface to the imaging-side surface at the optical axis. The air gap is measured from the imaging-side of a lens element to the object-side of an adjacent lens element along the optical axis. In an embodiment, the first lens element 3 has a thickness of 0.490 mm along the optical axis, and the air gap distance (measured at the optical axis) from the imaging-side surface of first lens element 3 to the object-side surface of second lens element 4 is 0.070 mm along the optical axis. The second lens element 4 has a thickness of 0.270 mm along the optical axis. The third lens element 5 has a thickness of 0.465 mm along the optical axis. The fourth lens element 6 has a thickness of 0.400 mm along the optical axis, and the fifth lens element 7 has a thickness of 0.350 mm along the optical axis. In an embodiment, the optical filter is interposed between fifth lens element 7 and imaging sensor 9. The optical filter may have a thickness of about 0.300 mm and disposed at a distance of about 0.441 mm from the imaging-side surface of fifth lens element 7 (measured at the optical axis) and at a distance of about 0.3 to 0.4 mm from the imaging sensor. In a preferred embodiment, the distance or air gap between the imaging-side surface of fifth lens element 7 (measured at the optical axis) and the optical filter is about 0.441 mm.

In an embodiment, the diameter d1 of the object-side surface of first lens element 3 is 1.377 mm. The diameter d2 of the imaging-side surface of first lens element 3 is 1.393 mm. Similarly, the diameter d3 of the object-side surface of second lens element 4 is 1.388 mm and the diameter d4 of the imaging-side surface of second lens element 4 is 1.390 mm. Likewise, the diameter d5 of the object-side surface of third lens element 5 is 1.494 mm and the diameter d6 of the imaging-side surface of third lens element 5 is 1.906 mm. The last 4 rows of Table 1 provide the respective object-side and imaging-side diameters d7 (2.078 mm), d8 (2.431 mm), d9 (2.870 mm), and d10 (3.402 mm) of fourth and fifth lens elements. In an embodiment, the thickness of the lens elements has a manufacturing tolerance of less than ±2 to less than ±6 microns depending on the power of the lens. In an embodiment, the tilt of the lens elements is less than ±0.1 degree.

A lens system may be characterized by the diameter ratios of the object-side surface of the lens elements. In an exemplary embodiment, the diameter ratios of the object-side surface of the lens elements are:

$$d1/d3 = 0.992 \quad (1a)$$

$$d3/d5 = 0.929 \quad (1b)$$

$$d5/d7 = 0.719 \quad (1c)$$

$$d7/d9 = 0.724 \quad (1d)$$

where d1, d3, d5, d7, and d9 are the object-side diameters of lens elements 3, 4, 5, 6, and 7, respectively.

A lens system may also be characterized by thickness ratios between lens elements. For example, in some embodiments of the present invention, the design of lens elements 3 and 4 and lens elements 5 and 6 may be characterized by the thickness ratio of t1/t2 of 1.81 and t3/t4 of 1.162, where t1, t2, t3, and t4 are the thickness of respective lens elements 3, 4, 5, and 6. Similarly, the design of lens elements 6 and 7 may be characterized by the thickness ratio t4/t5 of 1.143, where t5 is the thickness of lens element 7.

In some embodiments, the air gap ratios between lens elements may satisfy the following conditions:

$$0 < s2/s1 < 5.0 \quad (2a)$$

$$0 < s4/s3 < 0.7 \quad (2b)$$

$$0 < s3/s2 < 1.0 \quad (2c)$$

where s1 is the an air gap between the imaging-side surface of first lens element 3 and the object-side surface of second lens element 4, s2 is the air gap between the imaging-side surface of second lens element 4 and the object-side surface of third lens element 5, s3 is the air gap between the imaging-side surface of third lens element 5 and the object-side surface of fourth lens element 6, s4 is the air gap between the imaging-side surface of fourth lens element 6 and the object-side surface of fifth lens element 7.

Referring still to FIG. 3, the lens elements are rotationally symmetric about the optical axis. The optical performance of lens system 300 is generally related to the particular object-side and imaging-side surface shapes of the lens elements. These surfaces can be characterized by sag values at various radial distances from the optical axis.

Tables 2 through 6 include sag values of the lens elements 3, 4, 5, 6 and 7, respectively. The sag values are in millimeters. The "Normalized Lens Height" in the first and fourth columns of the Tables denotes the normalized relative distance of a location on the surface of the lens elements from the optical axis. In other words, 0.0% corresponds to the location at the optical axis, 50.0% and 100.0% correspond to the respective one half and the full radius of the lens elements in relation to the optical axis. The full radius is half the effective diameter. As the lens elements are rotationally symmetric about the optical axis, the surface of the lens elements is sufficiently represented by sag values for the normalized lens height from the optical axis. The sag tables are provided in sufficient detail to be used for the fabrication of the lens elements using a numerically controlled machining tool. The thus obtained lens elements may have a sag tolerance less than ±2 microns to less than ±6 microns depending on the lens power. It should be noted that, in actual manufacturing, a slope function is used to assure that surface slopes and tolerance variations do not cause step functions in the shape of the lens surface.

Table 2 contains sag data for fabricating lens element 3. The "Min Sag 3" and the "Max Sag 3" of the second and third columns are the minimum and maximum sag values of the object-side surface of lens element 3. Similarly, the "Min Sag 4" and the "Max Sag 4" of the fifth and sixth columns are the minimum and maximum sag values of the imaging-side surface of lens element 3. In an embodiment, the lens element 3 needs to be within the minimum and maximum sag values to ensure a given optical performance. The sag values are given in millimeters (mm).

TABLE 2

| Normalized Lens Height | Min Sag 3 | Max Sag 3 | Normalized Lens Ht | Min Sag 4 | Max Sag 4 |
|---|---|---|---|---|---|
| 0.0% | −0.001000 | 0.001000 | 0.0% | −0.001000 | 0.001000 |
| 1.4% | −0.000957 | 0.001043 | 1.4% | −0.000995 | 0.001005 |
| 2.9% | −0.000828 | 0.001172 | 2.9% | −0.000979 | 0.001021 |

TABLE 2-continued

| Normalized Lens Height | Min Sag 3 | Max Sag 3 | Normalized Lens Ht | Min Sag 4 | Max Sag 4 |
|---|---|---|---|---|---|
| 4.3% | −0.000613 | 0.001386 | 4.3% | −0.000952 | 0.001048 |
| 5.8% | −0.000312 | 0.001687 | 5.7% | −0.000915 | 0.001085 |
| 7.2% | 0.000075 | 0.002073 | 7.1% | −0.000868 | 0.001132 |
| 8.7% | 0.000548 | 0.002546 | 8.6% | −0.000811 | 0.001189 |
| 10.1% | 0.001108 | 0.003104 | 10.0% | −0.000744 | 0.001256 |
| 11.6% | 0.001754 | 0.003749 | 11.4% | −0.000668 | 0.001332 |
| 13.0% | 0.002487 | 0.004481 | 12.9% | −0.000582 | 0.001418 |
| 14.5% | 0.003306 | 0.005298 | 14.3% | −0.000488 | 0.001512 |
| 15.9% | 0.004212 | 0.006203 | 15.7% | −0.000385 | 0.001614 |
| 17.4% | 0.005205 | 0.007194 | 17.1% | −0.000275 | 0.001725 |
| 18.8% | 0.006286 | 0.008273 | 18.6% | −0.000157 | 0.001843 |
| 20.3% | 0.007454 | 0.009439 | 20.0% | −0.000033 | 0.001967 |
| 21.7% | 0.008710 | 0.010693 | 21.4% | 0.000098 | 0.002098 |
| 23.2% | 0.010054 | 0.012035 | 22.9% | 0.000235 | 0.002235 |
| 24.6% | 0.011486 | 0.013465 | 24.3% | 0.000377 | 0.002377 |
| 26.1% | 0.013008 | 0.014984 | 25.7% | 0.000524 | 0.002524 |
| 27.5% | 0.014618 | 0.016591 | 27.1% | 0.000676 | 0.002675 |
| 29.0% | 0.016319 | 0.018289 | 28.6% | 0.000831 | 0.002830 |
| 30.4% | 0.018109 | 0.020076 | 30.0% | 0.000989 | 0.002989 |
| 31.9% | 0.019990 | 0.021954 | 31.4% | 0.001150 | 0.003150 |
| 33.3% | 0.021962 | 0.023922 | 32.9% | 0.001314 | 0.003313 |
| 34.8% | 0.024025 | 0.025982 | 34.3% | 0.001479 | 0.003479 |
| 36.2% | 0.026181 | 0.028134 | 35.7% | 0.001646 | 0.003645 |
| 37.7% | 0.028429 | 0.030379 | 37.1% | 0.001813 | 0.003813 |
| 39.1% | 0.030771 | 0.032716 | 38.6% | 0.001982 | 0.003982 |
| 40.6% | 0.033206 | 0.035148 | 40.0% | 0.002151 | 0.004150 |
| 42.0% | 0.035737 | 0.037673 | 41.4% | 0.002319 | 0.004319 |
| 43.5% | 0.038362 | 0.040294 | 42.9% | 0.002488 | 0.004488 |
| 44.9% | 0.041083 | 0.043011 | 44.3% | 0.002656 | 0.004656 |
| 46.4% | 0.043901 | 0.045824 | 45.7% | 0.002823 | 0.004823 |
| 47.8% | 0.046817 | 0.048734 | 47.1% | 0.002989 | 0.004989 |
| 49.3% | 0.049830 | 0.051743 | 48.6% | 0.003154 | 0.005154 |
| 50.7% | 0.052943 | 0.054850 | 50.0% | 0.003317 | 0.005317 |
| 52.2% | 0.056156 | 0.058058 | 51.4% | 0.003479 | 0.005479 |
| 53.6% | 0.059470 | 0.061366 | 52.9% | 0.003639 | 0.005639 |
| 55.1% | 0.062886 | 0.064776 | 54.3% | 0.003797 | 0.005797 |
| 56.5% | 0.066405 | 0.068288 | 55.7% | 0.003953 | 0.005952 |
| 58.0% | 0.070027 | 0.071905 | 57.1% | 0.004106 | 0.006105 |
| 59.4% | 0.073755 | 0.075626 | 58.6% | 0.004256 | 0.006255 |
| 60.9% | 0.077589 | 0.079454 | 60.0% | 0.004402 | 0.006402 |
| 62.3% | 0.081531 | 0.083389 | 61.4% | 0.004545 | 0.006545 |
| 63.8% | 0.085581 | 0.087432 | 62.9% | 0.004684 | 0.006684 |
| 65.2% | 0.089742 | 0.091585 | 64.3% | 0.004818 | 0.006818 |
| 66.7% | 0.094014 | 0.095849 | 65.7% | 0.004945 | 0.006945 |
| 68.1% | 0.098398 | 0.100226 | 67.1% | 0.005066 | 0.007066 |
| 69.6% | 0.102897 | 0.104717 | 68.6% | 0.005179 | 0.007179 |
| 71.0% | 0.107511 | 0.109323 | 70.0% | 0.005282 | 0.007282 |
| 72.5% | 0.112242 | 0.114046 | 71.4% | 0.005374 | 0.007374 |
| 73.9% | 0.117092 | 0.118887 | 72.9% | 0.005453 | 0.007453 |
| 75.4% | 0.122061 | 0.123848 | 74.3% | 0.005517 | 0.007517 |
| 76.8% | 0.127152 | 0.128931 | 75.7% | 0.005562 | 0.007562 |
| 78.3% | 0.132366 | 0.134136 | 77.1% | 0.005586 | 0.007586 |
| 79.7% | 0.137705 | 0.139465 | 78.6% | 0.005585 | 0.007585 |
| 81.2% | 0.143169 | 0.144920 | 80.0% | 0.005555 | 0.007555 |
| 82.6% | 0.148760 | 0.150502 | 81.4% | 0.005491 | 0.007491 |
| 84.1% | 0.154480 | 0.156212 | 82.9% | 0.005388 | 0.007388 |
| 85.5% | 0.160330 | 0.162052 | 84.3% | 0.005239 | 0.007239 |
| 87.0% | 0.166310 | 0.168022 | 85.7% | 0.005038 | 0.007037 |
| 88.4% | 0.172422 | 0.174124 | 87.1% | 0.004775 | 0.006774 |
| 89.9% | 0.178666 | 0.180358 | 88.6% | 0.004442 | 0.006440 |
| 91.3% | 0.185042 | 0.186723 | 90.0% | 0.004028 | 0.006026 |
| 92.8% | 0.191549 | 0.193221 | 91.4% | 0.003520 | 0.005517 |
| 94.2% | 0.198187 | 0.199849 | 92.9% | 0.002907 | 0.004902 |
| 95.7% | 0.204953 | 0.206605 | 94.3% | 0.002171 | 0.004164 |
| 97.1% | 0.211843 | 0.213486 | 95.7% | 0.001295 | 0.003286 |
| 98.6% | 0.218852 | 0.220486 | 97.1% | 0.000261 | 0.002248 |
| 100.0% | 0.224758 | 0.226385 | 98.6% | −0.000955 | 0.001028 |
| | | | 100.0% | −0.001879 | 0.000100 |

Table 3 contains sag data for fabricating lens element 4. The "Min Sag 5" and the "Max Sag 5" of the second and third columns are the minimum and maximum sag values of the object-side surface of lens element 4. Similarly, the "Min Sag 6" and the "Max Sag 6" of the fifth and sixth columns are the minimum and maximum sag values of the imaging-side surface of lens element 4. In an embodiment, the lens element 4 needs to be within the minimum and maximum sag values to ensure a given optical performance. The sag values are given in mm.

TABLE 3

| Normalized Lens Height | Min Sag 5 | Max Sag 5 | Normalized Lens Height | Min Sag 6 | Max Sag 6 |
|---|---|---|---|---|---|
| 0.0% | −0.001000 | 0.001000 | 0.0% | −0.001000 | 0.001000 |
| 1.4% | −0.000992 | 0.001008 | 1.4% | −0.000974 | 0.001026 |
| 2.9% | −0.000968 | 0.001032 | 2.9% | −0.000894 | 0.001106 |
| 4.3% | −0.000929 | 0.001071 | 4.3% | −0.000762 | 0.001237 |
| 5.7% | −0.000875 | 0.001125 | 5.7% | −0.000578 | 0.001422 |
| 7.1% | −0.000805 | 0.001195 | 7.1% | −0.000341 | 0.001659 |
| 8.6% | −0.000720 | 0.001280 | 8.6% | −0.000051 | 0.001948 |
| 10.0% | −0.000621 | 0.001379 | 10.0% | 0.000291 | 0.002289 |
| 11.4% | −0.000508 | 0.001492 | 11.4% | 0.000684 | 0.002683 |
| 12.9% | −0.000382 | 0.001618 | 12.9% | 0.001130 | 0.003128 |
| 14.3% | −0.000243 | 0.001756 | 14.3% | 0.001627 | 0.003624 |
| 15.7% | −0.000093 | 0.001907 | 15.7% | 0.002175 | 0.004172 |
| 17.1% | 0.000069 | 0.002069 | 17.1% | 0.002774 | 0.004770 |
| 18.6% | 0.000242 | 0.002242 | 18.6% | 0.003424 | 0.005420 |
| 20.0% | 0.000425 | 0.002424 | 20.0% | 0.004124 | 0.006119 |
| 21.4% | 0.000616 | 0.002616 | 21.4% | 0.004875 | 0.006869 |
| 22.9% | 0.000815 | 0.002815 | 22.9% | 0.005675 | 0.007668 |
| 24.3% | 0.001022 | 0.003022 | 24.3% | 0.006525 | 0.008517 |
| 25.7% | 0.001236 | 0.003235 | 25.7% | 0.007424 | 0.009415 |
| 27.1% | 0.001455 | 0.003455 | 27.1% | 0.008372 | 0.010362 |
| 28.6% | 0.001679 | 0.003679 | 28.6% | 0.009369 | 0.011358 |
| 30.0% | 0.001908 | 0.003907 | 30.0% | 0.010414 | 0.012403 |
| 31.4% | 0.002139 | 0.004139 | 31.4% | 0.011509 | 0.013497 |
| 32.9% | 0.002374 | 0.004373 | 32.9% | 0.012652 | 0.014639 |
| 34.3% | 0.002611 | 0.004610 | 34.3% | 0.013844 | 0.015830 |
| 35.7% | 0.002849 | 0.004848 | 35.7% | 0.015085 | 0.017069 |
| 37.1% | 0.003088 | 0.005087 | 37.1% | 0.016375 | 0.018358 |
| 38.6% | 0.003328 | 0.005327 | 38.6% | 0.017714 | 0.019696 |
| 40.0% | 0.003567 | 0.005567 | 40.0% | 0.019103 | 0.021083 |
| 41.4% | 0.003806 | 0.005806 | 41.4% | 0.020542 | 0.022521 |
| 42.9% | 0.004045 | 0.006044 | 42.9% | 0.022032 | 0.024009 |
| 44.3% | 0.004282 | 0.006282 | 44.3% | 0.023573 | 0.025549 |
| 45.7% | 0.004519 | 0.006518 | 45.7% | 0.025167 | 0.027141 |
| 47.1% | 0.004754 | 0.006753 | 47.1% | 0.026813 | 0.028786 |
| 48.6% | 0.004988 | 0.006987 | 48.6% | 0.028514 | 0.030484 |
| 50.0% | 0.005220 | 0.007219 | 50.0% | 0.030269 | 0.032238 |
| 51.4% | 0.005450 | 0.007450 | 51.4% | 0.032082 | 0.034049 |
| 52.9% | 0.005680 | 0.007679 | 52.9% | 0.033952 | 0.035917 |
| 54.3% | 0.005907 | 0.007907 | 54.3% | 0.035882 | 0.037845 |
| 55.7% | 0.006134 | 0.008133 | 55.7% | 0.037874 | 0.039834 |
| 57.1% | 0.006359 | 0.008359 | 57.1% | 0.039928 | 0.041886 |
| 58.6% | 0.006583 | 0.008583 | 58.6% | 0.042047 | 0.044003 |
| 60.0% | 0.006807 | 0.008806 | 60.0% | 0.044234 | 0.046187 |
| 61.4% | 0.007029 | 0.009028 | 61.4% | 0.046491 | 0.048441 |
| 62.9% | 0.007250 | 0.009249 | 62.9% | 0.048820 | 0.050766 |
| 64.3% | 0.007470 | 0.009469 | 64.3% | 0.051224 | 0.053167 |
| 65.7% | 0.007688 | 0.009688 | 65.7% | 0.053706 | 0.055646 |
| 67.1% | 0.007905 | 0.009905 | 67.1% | 0.056270 | 0.058205 |
| 68.6% | 0.008120 | 0.010120 | 68.6% | 0.058918 | 0.060850 |
| 70.0% | 0.008333 | 0.010333 | 70.0% | 0.061656 | 0.063582 |
| 71.4% | 0.008543 | 0.010542 | 71.4% | 0.064486 | 0.066408 |
| 72.9% | 0.008748 | 0.010748 | 72.9% | 0.067413 | 0.069330 |
| 74.3% | 0.008948 | 0.010948 | 74.3% | 0.070443 | 0.072354 |
| 75.7% | 0.009142 | 0.011142 | 75.7% | 0.073581 | 0.075486 |
| 77.1% | 0.009327 | 0.011327 | 77.1% | 0.076832 | 0.078731 |
| 78.6% | 0.009502 | 0.011502 | 78.6% | 0.080204 | 0.082096 |
| 80.0% | 0.009664 | 0.011664 | 80.0% | 0.083704 | 0.085588 |
| 81.4% | 0.009811 | 0.011811 | 81.4% | 0.087339 | 0.089215 |
| 82.9% | 0.009939 | 0.011939 | 82.9% | 0.091119 | 0.092985 |
| 84.3% | 0.010045 | 0.012045 | 84.3% | 0.095054 | 0.096910 |
| 85.7% | 0.010125 | 0.012125 | 85.7% | 0.099155 | 0.101000 |
| 87.1% | 0.010174 | 0.012174 | 87.1% | 0.103435 | 0.105268 |
| 88.6% | 0.010186 | 0.012186 | 88.6% | 0.107909 | 0.109728 |
| 90.0% | 0.010157 | 0.012157 | 90.0% | 0.112594 | 0.114398 |
| 91.4% | 0.010081 | 0.012081 | 91.4% | 0.117509 | 0.119296 |
| 92.9% | 0.009950 | 0.011950 | 92.9% | 0.122677 | 0.124445 |
| 94.3% | 0.009758 | 0.011757 | 94.3% | 0.128127 | 0.129872 |
| 95.7% | 0.009497 | 0.011496 | 95.7% | 0.133889 | 0.135610 |

TABLE 3-continued

| Normalized Lens Height | Min Sag 5 | Max Sag 5 | Normalized Lens Height | Min Sag 6 | Max Sag 6 |
|---|---|---|---|---|---|
| 97.1% | 0.009161 | 0.011159 | 97.1% | 0.140003 | 0.141696 |
| 98.6% | 0.008740 | 0.010738 | 98.6% | 0.146517 | 0.148177 |
| 100.0% | 0.008535 | 0.010532 | 100.0% | 0.149821 | 0.151464 |

Table 4 contains sag data for fabricating lens element 5. The "Min Sag 7" and the "Max Sag 7" of the second and third columns are the minimum and maximum sag values of the object-side surface of lens element 5. Similarly, the "Min Sag 8" and the "Max Sag 8" of the fifth and sixth columns are the minimum and maximum sag values of the imaging-side surface of lens element 5. In an embodiment, the lens element 5 needs to be within the minimum and maximum sag values to ensure a given optical performance. The sag values are given in mm.

TABLE 4

| Normalized Lens Height | Min Sag 7 | Max Sag 7 | Normalized Lens Height | Min Sag 8 | Max Sag 8 |
|---|---|---|---|---|---|
| 0.0% | −0.001500 | 0.001500 | 0.0% | −0.001500 | 0.001500 |
| 1.3% | −0.001496 | 0.001504 | 1.0% | −0.001500 | 0.001500 |
| 2.7% | −0.001485 | 0.001515 | 2.1% | −0.001501 | 0.001499 |
| 4.0% | −0.001466 | 0.001534 | 3.1% | −0.001503 | 0.001497 |
| 5.3% | −0.001440 | 0.001560 | 4.2% | −0.001505 | 0.001495 |
| 6.7% | −0.001407 | 0.001593 | 5.2% | −0.001509 | 0.001491 |
| 8.0% | −0.001367 | 0.001633 | 6.3% | −0.001513 | 0.001487 |
| 9.3% | −0.001320 | 0.001680 | 7.3% | −0.001519 | 0.001481 |
| 10.7% | −0.001268 | 0.001732 | 8.3% | −0.001527 | 0.001473 |
| 12.0% | −0.001210 | 0.001790 | 9.4% | −0.001537 | 0.001463 |
| 13.3% | −0.001147 | 0.001853 | 10.4% | −0.001549 | 0.001451 |
| 14.7% | −0.001080 | 0.001920 | 11.5% | −0.001564 | 0.001436 |
| 16.0% | −0.001010 | 0.001990 | 12.5% | −0.001582 | 0.001418 |
| 17.3% | −0.000936 | 0.002064 | 13.5% | −0.001605 | 0.001395 |
| 18.7% | −0.000860 | 0.002140 | 14.6% | −0.001631 | 0.001369 |
| 20.0% | −0.000784 | 0.002216 | 15.6% | −0.001663 | 0.001337 |
| 21.3% | −0.000707 | 0.002293 | 16.7% | −0.001701 | 0.001299 |
| 22.7% | −0.000631 | 0.002369 | 17.7% | −0.001745 | 0.001255 |
| 24.0% | −0.000556 | 0.002444 | 18.8% | −0.001797 | 0.001203 |
| 25.3% | −0.000485 | 0.002515 | 19.8% | −0.001856 | 0.001144 |
| 26.7% | −0.000418 | 0.002582 | 20.8% | −0.001925 | 0.001075 |
| 28.0% | −0.000356 | 0.002644 | 21.9% | −0.002003 | 0.000996 |
| 29.3% | −0.000301 | 0.002699 | 22.9% | −0.002093 | 0.000907 |
| 30.7% | −0.000254 | 0.002746 | 24.0% | −0.002194 | 0.000806 |
| 32.0% | −0.000217 | 0.002783 | 25.0% | −0.002309 | 0.000691 |
| 33.3% | −0.000190 | 0.002810 | 26.0% | −0.002437 | 0.000562 |
| 34.7% | −0.000176 | 0.002824 | 27.1% | −0.002582 | 0.000418 |
| 36.0% | −0.000176 | 0.002824 | 28.1% | −0.002742 | 0.000257 |
| 37.3% | −0.000193 | 0.002807 | 29.2% | −0.002921 | 0.000078 |
| 38.7% | −0.000226 | 0.002774 | 30.2% | −0.003120 | −0.000121 |
| 40.0% | −0.000279 | 0.002721 | 31.3% | −0.003339 | −0.000340 |
| 41.3% | −0.000353 | 0.002646 | 32.3% | −0.003581 | −0.000582 |
| 42.7% | −0.000451 | 0.002549 | 33.3% | −0.003847 | −0.000848 |
| 44.0% | −0.000573 | 0.002426 | 34.4% | −0.004139 | −0.001141 |
| 45.3% | −0.000723 | 0.002277 | 35.4% | −0.004459 | −0.001460 |
| 46.7% | −0.000902 | 0.002097 | 36.5% | −0.004808 | −0.001809 |
| 48.0% | −0.001112 | 0.001887 | 37.5% | −0.005188 | −0.002190 |
| 49.3% | −0.001357 | 0.001642 | 38.5% | −0.005601 | −0.002604 |
| 50.7% | −0.001637 | 0.001362 | 39.6% | −0.006050 | −0.003054 |
| 52.0% | −0.001956 | 0.001042 | 40.6% | −0.006537 | −0.003541 |
| 53.3% | −0.002316 | 0.000682 | 41.7% | −0.007063 | −0.004068 |
| 54.7% | −0.002719 | 0.000278 | 42.7% | −0.007631 | −0.004637 |
| 56.0% | −0.003169 | −0.000172 | 43.8% | −0.008244 | −0.005250 |
| 57.3% | −0.003667 | −0.000671 | 44.8% | −0.008904 | −0.005911 |
| 58.7% | −0.004218 | −0.001223 | 45.8% | −0.009613 | −0.006622 |
| 60.0% | −0.004823 | −0.001829 | 46.9% | −0.010375 | −0.007384 |
| 61.3% | −0.005485 | −0.002492 | 47.9% | −0.011191 | −0.008202 |
| 62.7% | −0.006209 | −0.003217 | 49.0% | −0.012065 | −0.009077 |
| 64.0% | −0.006996 | −0.004006 | 50.0% | −0.013000 | −0.010013 |
| 65.3% | −0.007850 | −0.004862 | 51.0% | −0.013997 | −0.011013 |
| 66.7% | −0.008774 | −0.005788 | 52.1% | −0.015061 | −0.012079 |
| 68.0% | −0.009773 | −0.006789 | 53.1% | −0.016195 | −0.013215 |
| 69.3% | −0.010849 | −0.007867 | 54.2% | −0.017401 | −0.014424 |
| 70.7% | −0.012005 | −0.009026 | 55.2% | −0.018682 | −0.015708 |
| 72.0% | −0.013246 | −0.010270 | 56.3% | −0.020042 | −0.017071 |
| 73.3% | −0.014575 | −0.011603 | 57.3% | −0.021484 | −0.018517 |
| 74.7% | −0.015995 | −0.013027 | 58.3% | −0.023011 | −0.020047 |
| 76.0% | −0.017512 | −0.014548 | 59.4% | −0.024626 | −0.021667 |
| 77.3% | −0.019127 | −0.016168 | 60.4% | −0.026333 | −0.023378 |
| 78.7% | −0.020845 | −0.017891 | 61.5% | −0.028133 | −0.025184 |
| 80.0% | −0.022670 | −0.019722 | 62.5% | −0.030032 | −0.027087 |
| 81.3% | −0.024605 | −0.021663 | 63.5% | −0.032031 | −0.029092 |
| 82.7% | −0.026653 | −0.023718 | 64.6% | −0.034133 | −0.031201 |
| 84.0% | −0.028819 | −0.025891 | 65.6% | −0.036342 | −0.033416 |
| 85.3% | −0.031105 | −0.028185 | 66.7% | −0.038660 | −0.035741 |
| 86.7% | −0.033515 | −0.030603 | 67.7% | −0.041090 | −0.038178 |
| 88.0% | −0.036050 | −0.033147 | 68.8% | −0.043633 | −0.040730 |
| 89.3% | −0.038714 | −0.035820 | 69.8% | −0.046293 | −0.043399 |
| 90.7% | −0.041507 | −0.038623 | 70.8% | −0.049072 | −0.046186 |
| 92.0% | −0.044433 | −0.041559 | 71.9% | −0.051970 | −0.049094 |
| 93.3% | −0.047491 | −0.044627 | 72.9% | −0.054991 | −0.052124 |
| 94.7% | −0.050681 | −0.047828 | 74.0% | −0.058134 | −0.055278 |
| 96.0% | −0.054002 | −0.051161 | 75.0% | −0.061402 | −0.058556 |
| 97.3% | −0.057454 | −0.054624 | 76.0% | −0.064795 | −0.061960 |
| 98.7% | −0.061032 | −0.058214 | 77.1% | −0.068313 | −0.065489 |
| 100.0% | −0.063691 | −0.060881 | 78.1% | −0.071957 | −0.069144 |
| | | | 79.2% | −0.075725 | −0.072924 |
| | | | 80.2% | −0.079618 | −0.076829 |
| | | | 81.3% | −0.083634 | −0.080857 |
| | | | 82.3% | −0.087772 | −0.085007 |
| | | | 83.3% | −0.092030 | −0.089276 |
| | | | 84.4% | −0.096406 | −0.093664 |
| | | | 85.4% | −0.100897 | −0.098167 |
| | | | 86.5% | −0.105500 | −0.102781 |
| | | | 87.5% | −0.110213 | −0.107505 |
| | | | 88.5% | −0.115030 | −0.112334 |
| | | | 89.6% | −0.119950 | −0.117264 |
| | | | 90.6% | −0.124967 | −0.122292 |
| | | | 90.6% | −0.124967 | −0.122292 |
| | | | 90.6% | −0.124967 | −0.122292 |
| | | | 91.7% | −0.130079 | −0.127413 |
| | | | 92.7% | −0.135280 | −0.132624 |
| | | | 93.8% | −0.140567 | −0.137920 |
| | | | 94.8% | −0.145937 | −0.143299 |
| | | | 95.8% | −0.151386 | −0.148756 |
| | | | 96.9% | −0.156911 | −0.154290 |
| | | | 97.9% | −0.162512 | −0.159899 |
| | | | 99.0% | −0.168187 | −0.165582 |
| | | | 100.0% | −0.169863 | −0.167261 |

Table 5 contains sag data for fabricating lens element 6. The "Min Sag 9" and the "Max Sag 9" of the second and third columns are the minimum and maximum sag values of the object-side surface of lens element 6. Similarly, the "Min Sag 10" and the "Max Sag 10" of the fifth and sixth columns are the minimum and maximum sag values of the imaging-side surface of lens element 6. In an embodiment, the lens element 6 needs to be within the minimum and maximum sag values to ensure a given optical performance. The sag values are given in mm.

TABLE 5

| Normalized Lens Height | Min Sag 9 | Max Sag 9 | Normalized Lens Height | Min Sag 10 | Max Sag 10 |
|---|---|---|---|---|---|
| 0.0% | −0.003000 | 0.003000 | 0.0% | −0.003000 | 0.003000 |
| 1.0% | −0.003026 | 0.002974 | 0.8% | −0.003056 | 0.002944 |
| 1.9% | −0.003103 | 0.002896 | 1.6% | −0.003223 | 0.002776 |
| 2.9% | −0.003232 | 0.002767 | 2.5% | −0.003501 | 0.002496 |
| 3.8% | −0.003412 | 0.002586 | 3.3% | −0.003890 | 0.002104 |
| 4.8% | −0.003644 | 0.002354 | 4.1% | −0.004390 | 0.001601 |

TABLE 5-continued

| Normalized Lens Height | Min Sag 9 | Max Sag 9 | Normalized Lens Height | Min Sag 10 | Max Sag 10 |
|---|---|---|---|---|---|
| 5.8% | −0.003926 | 0.002071 | 4.9% | −0.005000 | 0.000987 |
| 6.7% | −0.004260 | 0.001736 | 5.7% | −0.005719 | 0.000263 |
| 7.7% | −0.004644 | 0.001351 | 6.6% | −0.006547 | −0.000570 |
| 8.7% | −0.005077 | 0.000916 | 7.4% | −0.007483 | −0.001512 |
| 9.6% | −0.005561 | 0.000431 | 8.2% | −0.008526 | −0.002562 |
| 10.6% | −0.006095 | −0.000104 | 9.0% | −0.009676 | −0.003720 |
| 11.5% | −0.006677 | −0.000688 | 9.8% | −0.010932 | −0.004983 |
| 12.5% | −0.007309 | −0.001322 | 10.7% | −0.012293 | −0.006352 |
| 13.5% | −0.007989 | −0.002004 | 11.5% | −0.013757 | −0.007825 |
| 14.4% | −0.008718 | −0.002735 | 12.3% | −0.015325 | −0.009402 |
| 15.4% | −0.009495 | −0.003514 | 13.1% | −0.016995 | −0.011082 |
| 16.3% | −0.010319 | −0.004341 | 13.9% | −0.018766 | −0.012864 |
| 17.3% | −0.011192 | −0.005216 | 14.8% | −0.020638 | −0.014747 |
| 18.3% | −0.012113 | −0.006140 | 15.6% | −0.022610 | −0.016730 |
| 19.2% | −0.013082 | −0.007111 | 16.4% | −0.024682 | −0.018813 |
| 20.2% | −0.014099 | −0.008131 | 17.2% | −0.026852 | −0.020995 |
| 21.2% | −0.015164 | −0.009199 | 18.0% | −0.029121 | −0.023276 |
| 22.1% | −0.016277 | −0.010315 | 18.9% | −0.031487 | −0.025656 |
| 23.1% | −0.017439 | −0.011481 | 19.7% | −0.033951 | −0.028133 |
| 24.0% | −0.018650 | −0.012695 | 20.5% | −0.036512 | −0.030708 |
| 25.0% | −0.019911 | −0.013960 | 21.3% | −0.039170 | −0.033380 |
| 26.0% | −0.021221 | −0.015274 | 22.1% | −0.041925 | −0.036149 |
| 26.9% | −0.022582 | −0.016639 | 23.0% | −0.044776 | −0.039015 |
| 27.9% | −0.023995 | −0.018056 | 23.8% | −0.047724 | −0.041978 |
| 28.8% | −0.025459 | −0.019525 | 24.6% | −0.050769 | −0.045038 |
| 29.8% | −0.026976 | −0.021046 | 25.4% | −0.053909 | −0.048194 |
| 30.8% | −0.028546 | −0.022622 | 26.2% | −0.057146 | −0.051447 |
| 31.7% | −0.030171 | −0.024251 | 27.0% | −0.060479 | −0.054796 |
| 32.7% | −0.031851 | −0.025937 | 27.9% | −0.063908 | −0.058242 |
| 33.7% | −0.033587 | −0.027679 | 28.7% | −0.067433 | −0.061784 |
| 34.6% | −0.035380 | −0.029478 | 29.5% | −0.071054 | −0.065422 |
| 35.6% | −0.037232 | −0.031336 | 30.3% | −0.074770 | −0.069156 |
| 36.5% | −0.039142 | −0.033253 | 31.1% | −0.078582 | −0.072986 |
| 37.5% | −0.041114 | −0.035231 | 32.0% | −0.082489 | −0.076911 |
| 38.5% | −0.043146 | −0.037270 | 32.8% | −0.086491 | −0.080931 |
| 39.4% | −0.045241 | −0.039373 | 33.6% | −0.090587 | −0.085045 |
| 40.4% | −0.047400 | −0.041540 | 34.4% | −0.094776 | −0.089253 |
| 41.3% | −0.049624 | −0.043772 | 35.2% | −0.099059 | −0.093554 |
| 42.3% | −0.051915 | −0.046071 | 36.1% | −0.103434 | −0.097948 |
| 43.3% | −0.054273 | −0.048438 | 36.9% | −0.107900 | −0.102433 |
| 44.2% | −0.056699 | −0.050874 | 37.7% | −0.112458 | −0.107009 |
| 45.2% | −0.059196 | −0.053380 | 38.5% | −0.117105 | −0.111675 |
| 46.2% | −0.061764 | −0.055958 | 39.3% | −0.121840 | −0.116429 |
| 47.1% | −0.064404 | −0.058608 | 40.2% | −0.126664 | −0.121271 |
| 48.1% | −0.067117 | −0.061333 | 41.0% | −0.131573 | −0.126199 |
| 49.0% | −0.069905 | −0.064132 | 41.8% | −0.136568 | −0.131211 |
| 50.0% | −0.072768 | −0.067006 | 42.6% | −0.141646 | −0.136307 |
| 51.0% | −0.075707 | −0.069957 | 43.4% | −0.146807 | −0.141485 |
| 51.9% | −0.078722 | −0.072985 | 44.3% | −0.152047 | −0.146743 |
| 52.9% | −0.081814 | −0.076089 | 45.1% | −0.157366 | −0.152079 |
| 53.8% | −0.084984 | −0.079271 | 45.9% | −0.162761 | −0.157491 |
| 54.8% | −0.088229 | −0.082530 | 46.7% | −0.168230 | −0.162976 |
| 55.8% | −0.091551 | −0.085865 | 47.5% | −0.173771 | −0.168533 |
| 56.7% | −0.094949 | −0.089275 | 48.4% | −0.179381 | −0.174158 |
| 57.7% | −0.098419 | −0.092759 | 49.2% | −0.185057 | −0.179848 |
| 58.7% | −0.101962 | −0.096314 | 50.0% | −0.190795 | −0.185599 |
| 59.6% | −0.105575 | −0.099939 | 50.8% | −0.196592 | −0.191409 |
| 60.6% | −0.109254 | −0.103630 | 51.6% | −0.202444 | −0.197272 |
| 61.5% | −0.112997 | −0.107384 | 52.5% | −0.208345 | −0.203184 |
| 62.5% | −0.116799 | −0.111197 | 53.3% | −0.214291 | −0.209140 |
| 63.5% | −0.120656 | −0.115064 | 54.1% | −0.220276 | −0.215133 |
| 64.4% | −0.124564 | −0.118980 | 54.9% | −0.226294 | −0.221157 |
| 65.4% | −0.128515 | −0.122940 | 55.7% | −0.232337 | −0.227205 |
| 66.3% | −0.132506 | −0.126937 | 56.6% | −0.238398 | −0.233268 |
| 67.3% | −0.136528 | −0.130964 | 57.4% | −0.244468 | −0.239340 |
| 68.3% | −0.140575 | −0.135015 | 58.2% | −0.250539 | −0.245409 |
| 69.2% | −0.144639 | −0.139082 | 59.0% | −0.256601 | −0.251467 |
| 70.2% | −0.148714 | −0.143159 | 59.8% | −0.262642 | −0.257503 |
| 71.2% | −0.152793 | −0.147236 | 60.7% | −0.268652 | −0.263504 |
| 72.1% | −0.156866 | −0.151308 | 61.5% | −0.274620 | −0.269460 |
| 73.1% | −0.160928 | −0.155367 | 62.3% | −0.280532 | −0.275358 |
| 74.0% | −0.164971 | −0.159406 | 63.1% | −0.286376 | −0.281185 |
| 75.0% | −0.168989 | −0.163419 | 63.9% | −0.292138 | −0.286926 |
| 76.0% | −0.172977 | −0.167400 | 64.8% | −0.297804 | −0.292570 |
| 76.9% | −0.176929 | −0.171345 | 65.6% | −0.303362 | −0.298101 |
| 77.9% | −0.180843 | −0.175251 | 66.4% | −0.308796 | −0.303506 |
| 78.8% | −0.184715 | −0.179115 | 67.2% | −0.314092 | −0.308771 |
| 79.8% | −0.188545 | −0.182937 | 68.0% | −0.319238 | −0.313882 |
| 80.8% | −0.192334 | −0.186719 | 68.9% | −0.324221 | −0.318828 |
| 81.7% | −0.196084 | −0.190463 | 69.7% | −0.329026 | −0.323595 |
| 82.7% | −0.199802 | −0.194174 | 70.5% | −0.333644 | −0.328172 |
| 83.7% | −0.203493 | −0.197862 | 71.3% | −0.338063 | −0.332550 |
| 84.6% | −0.207167 | −0.201535 | 72.1% | −0.342274 | −0.336719 |
| 85.6% | −0.210838 | −0.205206 | 73.0% | −0.346269 | −0.340672 |
| 86.5% | −0.214520 | −0.208892 | 73.8% | −0.350041 | −0.344402 |
| 87.5% | −0.218231 | −0.212610 | 74.6% | −0.353586 | −0.347907 |
| 88.5% | −0.221992 | −0.216383 | 75.4% | −0.356901 | −0.351183 |
| 89.4% | −0.225827 | −0.220235 | 76.2% | −0.359985 | −0.354231 |
| 90.4% | −0.229763 | −0.224194 | 77.0% | −0.362840 | −0.357051 |
| 91.3% | −0.233830 | −0.228290 | 77.9% | −0.365469 | −0.359648 |
| 92.3% | −0.238060 | −0.232557 | 78.7% | −0.367877 | −0.362028 |
| 93.3% | −0.242488 | −0.237030 | 79.5% | −0.370071 | −0.364197 |
| 94.2% | −0.247150 | −0.241745 | 80.3% | −0.372062 | −0.366165 |
| 95.2% | −0.252082 | −0.246740 | 81.1% | −0.373859 | −0.367944 |
| 96.2% | −0.257318 | −0.252047 | 82.0% | −0.375476 | −0.369545 |
| 97.1% | −0.262891 | −0.257698 | 82.8% | −0.376927 | −0.370982 |
| 98.1% | −0.268821 | −0.263712 | 83.6% | −0.378226 | −0.372270 |
| 99.0% | −0.275122 | −0.270097 | 84.4% | −0.379389 | −0.373425 |
| 100.0% | −0.281059 | −0.276105 | 85.2% | −0.380432 | −0.374461 |
| | | | 86.1% | −0.381371 | −0.375395 |
| | | | 86.9% | −0.382223 | −0.376242 |
| | | | 87.7% | −0.383002 | −0.377018 |
| | | | 88.5% | −0.383722 | −0.377737 |
| | | | 89.3% | −0.384399 | −0.378411 |
| | | | 90.2% | −0.385042 | −0.379054 |
| | | | 91.0% | −0.385665 | −0.379676 |
| | | | 91.8% | −0.386276 | −0.380287 |
| | | | 92.6% | −0.386884 | −0.380895 |
| | | | 93.4% | −0.387497 | −0.381509 |
| | | | 94.3% | −0.388122 | −0.382134 |
| | | | 95.1% | −0.388765 | −0.382778 |
| | | | 95.9% | −0.389432 | −0.383446 |
| | | | 96.7% | −0.390131 | −0.384147 |
| | | | 97.5% | −0.390870 | −0.384887 |
| | | | 98.4% | −0.391657 | −0.385677 |
| | | | 99.2% | −0.392503 | −0.386526 |
| | | | 100.0% | −0.392975 | −0.387000 |

Table 6 contains sag data for fabricating lens element 7. The "Min Sag 11" and the "Max Sag 11" of the second and third columns are the minimum and maximum sag values of the object-side surface of lens element 7. Similarly, the "Min Sag 12" and the "Max Sag 12" of the fifth and sixth columns are the minimum and maximum sag values of the imaging-side surface of lens element 7. In an embodiment, the lens element 7 needs to be within the minimum and maximum sag values to ensure a given optical performance. The sag values are given in mm.

TABLE 6

| Normalized Lens Height | Min Sag 11 | Max Sag 11 | Normalized Lens Height | Min Sag 12 | Max Sag 12 |
|---|---|---|---|---|---|
| 0.0% | −0.003000 | 0.003000 | 0.0% | −0.003000 | 0.003000 |
| 0.7% | −0.002983 | 0.003017 | 0.6% | −0.002940 | 0.003060 |
| 1.4% | −0.002933 | 0.003067 | 1.2% | −0.002759 | 0.003239 |
| 2.1% | −0.002849 | 0.003150 | 1.8% | −0.002458 | 0.003538 |
| 2.8% | −0.002733 | 0.003267 | 2.3% | −0.002038 | 0.003955 |
| 3.5% | −0.002584 | 0.003415 | 2.9% | −0.001500 | 0.004489 |
| 4.2% | −0.002403 | 0.003596 | 3.5% | −0.000846 | 0.005139 |
| 4.9% | −0.002191 | 0.003807 | 4.1% | −0.000077 | 0.005903 |
| 5.6% | −0.001950 | 0.004048 | 4.7% | 0.000806 | 0.006780 |
| 6.3% | −0.001679 | 0.004318 | 5.3% | 0.001798 | 0.007766 |
| 6.9% | −0.001381 | 0.004616 | 5.8% | 0.002899 | 0.008860 |
| 7.6% | −0.001057 | 0.004940 | 6.4% | 0.004105 | 0.010058 |
| 8.3% | −0.000708 | 0.005288 | 7.0% | 0.005412 | 0.011358 |

TABLE 6-continued

| Normalized Lens Height | Min Sag 11 | Max Sag 11 | Normalized Lens Height | Min Sag 12 | Max Sag 12 |
|---|---|---|---|---|---|
| 9.0% | −0.000337 | 0.005658 | 7.6% | 0.006819 | 0.012757 |
| 9.7% | 0.000054 | 0.006050 | 8.2% | 0.008321 | 0.014250 |
| 10.4% | 0.000464 | 0.006459 | 8.8% | 0.009914 | 0.015835 |
| 11.1% | 0.000890 | 0.006884 | 9.4% | 0.011595 | 0.017508 |
| 11.8% | 0.001329 | 0.007323 | 9.9% | 0.013359 | 0.019264 |
| 12.5% | 0.001778 | 0.007772 | 10.5% | 0.015203 | 0.021100 |
| 13.2% | 0.002235 | 0.008229 | 11.1% | 0.017122 | 0.023011 |
| 13.9% | 0.002696 | 0.008690 | 11.7% | 0.019112 | 0.024993 |
| 14.6% | 0.003158 | 0.009151 | 12.3% | 0.021168 | 0.027042 |
| 15.3% | 0.003617 | 0.009611 | 12.9% | 0.023286 | 0.029153 |
| 16.0% | 0.004070 | 0.010064 | 13.5% | 0.025462 | 0.031322 |
| 16.7% | 0.004514 | 0.010508 | 14.0% | 0.027690 | 0.033544 |
| 17.4% | 0.004943 | 0.010938 | 14.6% | 0.029966 | 0.035814 |
| 18.1% | 0.005355 | 0.011350 | 15.2% | 0.032287 | 0.038129 |
| 18.8% | 0.005745 | 0.011740 | 15.8% | 0.034646 | 0.040484 |
| 19.4% | 0.006109 | 0.012105 | 16.4% | 0.037040 | 0.042873 |
| 20.1% | 0.006443 | 0.012440 | 17.0% | 0.039464 | 0.045294 |
| 20.8% | 0.006743 | 0.012741 | 17.5% | 0.041915 | 0.047741 |
| 21.5% | 0.007006 | 0.013004 | 18.1% | 0.044387 | 0.050210 |
| 22.2% | 0.007226 | 0.013225 | 18.7% | 0.046876 | 0.052697 |
| 22.9% | 0.007400 | 0.013400 | 19.3% | 0.049379 | 0.055199 |
| 23.6% | 0.007525 | 0.013524 | 19.9% | 0.051891 | 0.057710 |
| 24.3% | 0.007596 | 0.013595 | 20.5% | 0.054409 | 0.060228 |
| 25.0% | 0.007609 | 0.013609 | 21.1% | 0.056929 | 0.062748 |
| 25.7% | 0.007562 | 0.013562 | 21.6% | 0.059448 | 0.065266 |
| 26.4% | 0.007451 | 0.013450 | 22.2% | 0.061961 | 0.067781 |
| 27.1% | 0.007273 | 0.013271 | 22.8% | 0.064466 | 0.070287 |
| 27.8% | 0.007024 | 0.013022 | 23.4% | 0.066959 | 0.072782 |
| 28.5% | 0.006703 | 0.012699 | 24.0% | 0.069438 | 0.075263 |
| 29.2% | 0.006306 | 0.012300 | 24.6% | 0.071899 | 0.077727 |
| 29.9% | 0.005831 | 0.011823 | 25.1% | 0.074340 | 0.080170 |
| 30.6% | 0.005275 | 0.011264 | 25.7% | 0.076758 | 0.082592 |
| 31.3% | 0.004637 | 0.010624 | 26.3% | 0.079151 | 0.084988 |
| 31.9% | 0.003915 | 0.009898 | 26.9% | 0.081515 | 0.087356 |
| 32.6% | 0.003108 | 0.009086 | 27.5% | 0.083850 | 0.089694 |
| 33.3% | 0.002212 | 0.008186 | 28.1% | 0.086152 | 0.092001 |
| 34.0% | 0.001228 | 0.007196 | 28.7% | 0.088420 | 0.094273 |
| 34.7% | 0.000153 | 0.006116 | 29.2% | 0.090651 | 0.096509 |
| 35.4% | −0.001012 | 0.004944 | 29.8% | 0.092844 | 0.098707 |
| 36.1% | −0.002270 | 0.003679 | 30.4% | 0.094998 | 0.100866 |
| 36.8% | −0.003621 | 0.002321 | 31.0% | 0.097110 | 0.102982 |
| 37.5% | −0.005066 | 0.000868 | 31.6% | 0.099178 | 0.105056 |
| 38.2% | −0.006606 | −0.000680 | 32.2% | 0.101202 | 0.107085 |
| 38.9% | −0.008241 | −0.002324 | 32.7% | 0.103180 | 0.109068 |
| 39.6% | −0.009971 | −0.004064 | 33.3% | 0.105111 | 0.111004 |
| 40.3% | −0.011798 | −0.005901 | 33.9% | 0.106992 | 0.112891 |
| 41.0% | −0.013721 | −0.007835 | 34.5% | 0.108823 | 0.114728 |
| 41.7% | −0.015742 | −0.009867 | 35.1% | 0.110603 | 0.116513 |
| 42.4% | −0.017859 | −0.011996 | 35.7% | 0.112331 | 0.118246 |
| 43.1% | −0.020074 | −0.014223 | 36.3% | 0.114005 | 0.119925 |
| 43.8% | −0.022386 | −0.016548 | 36.8% | 0.115624 | 0.121549 |
| 44.4% | −0.024797 | −0.018971 | 37.4% | 0.117188 | 0.123118 |
| 45.1% | −0.027304 | −0.021492 | 38.0% | 0.118694 | 0.124629 |
| 45.8% | −0.029910 | −0.024111 | 38.6% | 0.120143 | 0.126083 |
| 46.5% | −0.032612 | −0.026828 | 39.2% | 0.121533 | 0.127478 |
| 47.2% | −0.035412 | −0.029643 | 39.8% | 0.122863 | 0.128813 |
| 47.9% | −0.038309 | −0.032555 | 40.4% | 0.124132 | 0.130087 |
| 48.6% | −0.041303 | −0.035563 | 40.9% | 0.125340 | 0.131299 |
| 49.3% | −0.044392 | −0.038668 | 41.5% | 0.126485 | 0.132448 |
| 50.0% | −0.047577 | −0.041869 | 42.1% | 0.127567 | 0.133534 |
| 50.7% | −0.050857 | −0.045165 | 42.7% | 0.128584 | 0.134555 |
| 51.4% | −0.054230 | −0.048555 | 43.3% | 0.129536 | 0.135511 |
| 52.1% | −0.057697 | −0.052038 | 43.9% | 0.130422 | 0.136400 |
| 52.8% | −0.061256 | −0.055613 | 44.4% | 0.131240 | 0.137222 |
| 53.5% | −0.064907 | −0.059280 | 45.0% | 0.131991 | 0.137976 |
| 54.2% | −0.068647 | −0.063037 | 45.6% | 0.132673 | 0.138661 |
| 54.9% | −0.072476 | −0.066882 | 46.2% | 0.133286 | 0.139276 |
| 55.6% | −0.076392 | −0.070815 | 46.8% | 0.133828 | 0.139820 |
| 56.3% | −0.080395 | −0.074834 | 47.4% | 0.134299 | 0.140293 |
| 56.9% | −0.084482 | −0.078938 | 48.0% | 0.134697 | 0.140693 |
| 57.6% | −0.088652 | −0.083124 | 48.5% | 0.135023 | 0.141020 |
| 58.3% | −0.092903 | −0.087391 | 49.1% | 0.135274 | 0.141273 |
| 59.0% | −0.097234 | −0.091738 | 49.7% | 0.135451 | 0.141451 |
| 59.7% | −0.101642 | −0.096161 | 50.3% | 0.135552 | 0.141552 |
| 60.4% | −0.106126 | −0.100661 | 50.9% | 0.135577 | 0.141576 |
| 61.1% | −0.110684 | −0.105233 | 51.5% | 0.135523 | 0.141523 |
| 61.8% | −0.115312 | −0.109876 | 52.0% | 0.135392 | 0.141391 |
| 62.5% | −0.120009 | −0.114587 | 52.6% | 0.135180 | 0.141178 |
| 63.2% | −0.124772 | −0.119363 | 53.2% | 0.134889 | 0.140885 |
| 63.9% | −0.129597 | −0.124201 | 53.8% | 0.134516 | 0.140510 |
| 64.6% | −0.134482 | −0.129098 | 54.4% | 0.134060 | 0.140052 |
| 65.3% | −0.139423 | −0.134051 | 55.0% | 0.133521 | 0.139511 |
| 66.0% | −0.144416 | −0.139054 | 55.6% | 0.132897 | 0.138884 |
| 66.7% | −0.149456 | −0.144104 | 56.1% | 0.132187 | 0.138170 |
| 67.4% | −0.154539 | −0.149196 | 56.7% | 0.131391 | 0.137370 |
| 68.1% | −0.159661 | −0.154324 | 57.3% | 0.130507 | 0.136481 |
| 68.8% | −0.164814 | −0.159484 | 57.9% | 0.129533 | 0.135502 |
| 69.4% | −0.169993 | −0.164668 | 58.5% | 0.128469 | 0.134432 |
| 70.1% | −0.175192 | −0.169870 | 59.1% | 0.127313 | 0.133270 |
| 70.8% | −0.180403 | −0.175083 | 59.6% | 0.126065 | 0.132014 |
| 71.5% | −0.185619 | −0.180299 | 60.2% | 0.124721 | 0.130664 |
| 72.2% | −0.190832 | −0.185511 | 60.8% | 0.123283 | 0.129217 |
| 72.9% | −0.196034 | −0.190709 | 61.4% | 0.121747 | 0.127673 |
| 73.6% | −0.201217 | −0.195886 | 62.0% | 0.120113 | 0.126029 |
| 74.3% | −0.206370 | −0.201033 | 62.6% | 0.118378 | 0.124284 |
| 75.0% | −0.211487 | −0.206140 | 63.2% | 0.116543 | 0.122438 |
| 75.7% | −0.216557 | −0.211198 | 63.7% | 0.114604 | 0.120488 |
| 76.4% | −0.221571 | −0.216200 | 64.3% | 0.112561 | 0.118432 |
| 77.1% | −0.226521 | −0.221134 | 64.9% | 0.110411 | 0.116270 |
| 77.8% | −0.231398 | −0.225995 | 65.5% | 0.108154 | 0.113999 |
| 78.5% | −0.236193 | −0.230772 | 66.1% | 0.105787 | 0.111618 |
| 79.2% | −0.240900 | −0.235459 | 66.7% | 0.103309 | 0.109124 |
| 79.9% | −0.245510 | −0.240049 | 67.3% | 0.100718 | 0.106517 |
| 80.6% | −0.250018 | −0.244535 | 67.8% | 0.098012 | 0.103794 |
| 81.3% | −0.254416 | −0.248911 | 68.4% | 0.095190 | 0.100954 |
| 81.9% | −0.258701 | −0.253173 | 69.0% | 0.092248 | 0.097994 |
| 82.6% | −0.262869 | −0.257316 | 69.6% | 0.089186 | 0.094912 |
| 83.3% | −0.266915 | −0.261339 | 70.2% | 0.086002 | 0.091707 |
| 84.0% | −0.270837 | −0.265237 | 70.8% | 0.082692 | 0.088376 |
| 84.7% | −0.274634 | −0.269011 | 71.3% | 0.079256 | 0.084917 |
| 85.4% | −0.278305 | −0.272659 | 71.9% | 0.075691 | 0.081329 |
| 86.1% | −0.281849 | −0.276181 | 72.5% | 0.071994 | 0.077608 |
| 86.8% | −0.285268 | −0.279577 | 73.1% | 0.068165 | 0.073753 |
| 87.5% | −0.288561 | −0.282850 | 73.7% | 0.064199 | 0.069761 |
| 88.2% | −0.291731 | −0.286000 | 74.3% | 0.060096 | 0.065630 |
| 88.9% | −0.294778 | −0.289028 | 74.9% | 0.055852 | 0.061359 |
| 89.6% | −0.297706 | −0.291937 | 75.4% | 0.051466 | 0.056943 |
| 90.3% | −0.300516 | −0.294730 | 76.0% | 0.046935 | 0.052382 |
| 91.0% | −0.303210 | −0.297407 | 76.6% | 0.042258 | 0.047673 |
| 91.7% | −0.305791 | −0.299972 | 77.2% | 0.037430 | 0.042814 |
| 92.4% | −0.308261 | −0.302428 | 77.8% | 0.032452 | 0.037803 |
| 93.1% | −0.310623 | −0.304776 | 78.4% | 0.027319 | 0.032637 |
| 93.8% | −0.312880 | −0.307020 | 78.9% | 0.022031 | 0.027314 |
| 94.4% | −0.315035 | −0.309163 | 79.5% | 0.016585 | 0.021832 |
| 95.1% | −0.317092 | −0.311209 | 80.1% | 0.010979 | 0.016190 |
| 95.8% | −0.319056 | −0.313163 | 80.7% | 0.005211 | 0.010386 |
| 96.5% | −0.320933 | −0.315031 | 81.3% | −0.000721 | 0.004417 |
| 97.2% | −0.322729 | −0.316819 | 81.9% | −0.006817 | −0.001717 |
| 97.9% | −0.324452 | −0.318536 | 82.5% | −0.013081 | −0.008019 |
| 98.6% | −0.326114 | −0.320192 | 83.0% | −0.019513 | −0.014490 |
| 99.3% | −0.327726 | −0.321801 | 83.6% | −0.026114 | −0.021131 |
| 100.0% | −0.328471 | −0.322544 | 84.2% | −0.032887 | −0.027944 |
| | | | 84.8% | −0.039833 | −0.034930 |
| | | | 85.4% | −0.046952 | −0.042089 |
| | | | 86.0% | −0.054247 | −0.049425 |
| | | | 86.5% | −0.061718 | −0.056936 |
| | | | 87.1% | −0.069366 | −0.064626 |
| | | | 87.7% | −0.077193 | −0.072494 |
| | | | 88.3% | −0.085201 | −0.080542 |
| | | | 88.9% | −0.093389 | −0.088772 |
| | | | 89.5% | −0.101760 | −0.097184 |
| | | | 90.1% | −0.110314 | −0.105780 |
| | | | 90.6% | −0.119054 | −0.114561 |
| | | | 91.2% | −0.127979 | −0.123527 |
| | | | 91.8% | −0.137090 | −0.132680 |
| | | | 92.4% | −0.146388 | −0.142019 |
| | | | 93.0% | −0.155873 | −0.151545 |
| | | | 93.6% | −0.165545 | −0.161257 |

TABLE 6-continued

| Normalized Lens Height | Min Sag 11 | Max Sag 11 | Normalized Lens Height | Min Sag 12 | Max Sag 12 |
|---|---|---|---|---|---|
| | | | 94.2% | −0.175403 | −0.171154 |
| | | | 94.7% | −0.185446 | −0.181237 |
| | | | 95.3% | −0.195674 | −0.191502 |
| | | | 95.9% | −0.206084 | −0.201950 |
| | | | 96.5% | −0.216677 | −0.212581 |
| | | | 97.1% | −0.227455 | −0.223397 |
| | | | 97.7% | −0.238422 | −0.234404 |
| | | | 98.2% | −0.249590 | −0.245613 |
| | | | 98.8% | −0.260978 | −0.257047 |
| | | | 99.4% | −0.272618 | −0.268741 |
| | | | 100.0% | −0.273295 | −0.269422 |

In an embodiment, the ratio between the sag values at 75 percent point and at 25 percent point of the object-side surface of fourth lens element 6 satisfies the following condition:

$$7.0 < sag9(75)/sag9(25) < 14.0 \qquad (3)$$

where sag9(75) is the sag value at 75 percent point of the clear aperture radius of the object-side of the fourth lens element measured from the optical axis, and sag9(25) is the sag value at 25 percent point of the clear aperture radius of the object-side of the fourth lens element 6. In some embodiments, the ratio between the sag values at 75 percent point and at 25 percent point of the object-side surface of fourth lens element 5 in relation (3) is preferably in a range from 8.0 to 12.5.

In an exemplary embodiment, the object-side surface of fourth lens element 6 has a minimum sag at the 25 percent point from the optical axis of about 19.9 microns and a maximum sag at the 75 percent point from the optical axis of about 163.4 microns. It is noted that the sag values are given in terms of absolute value. If the ratio in condition (3) exceeds the lower limit, the optical power of the fourth lens element and the lens system 300 may be reduced. If the ratio in condition (3) is greater than the upper limit, the optical performance of the lens system 300 may be affected.

Additionally, the object-side surface of fifth lens element 7 has a sag value at 100 percent point satisfying the following condition:

$$|sag11(100)| > 320 \text{ microns} \qquad (4)$$

where |sag11(100)| is the absolute sag value at 100 percent point of the clear aperture radius measured from the optical axis of the object-side surface of the fifth lens element.

Furthermore, the imaging-side surface of fifth lens element 7 provides the largest sag value at a certain percentage point of the effective radius. In an embodiment, the largest absolute sag value is greater than 260 microns at 100 percentage point of the clear aperture radius of the fifth lens element. That is, the imaging-side surface of the fifth lens element satisfies the following condition:

$$|sag12(max)| > 260 \text{ microns} \qquad (5)$$

where |sag12(max)| denotes the largest absolute sag value of the imaging-side surface of the fifth lens element.

If the imaging-side surface of the fifth lens element does not meet the condition (5), the lens system 200 of FIG. 2 may have astigmatism and aberration that exceeds the target design specifications. In some embodiments, the conditions (1a-1d), (2a-2c), (3), (4), and (5) allow the system to be constructed with a target total track length.

In an embodiment, first, second, third, fourth, and fifth lens elements can be made of plastic or glass. The Abbe number of first lens element 3 is vd1, the Abbe number of second lens element 4 is vd2, the Abbe number of third lens element 5 is vd3, the Abbe number of fourth lens element 6 is vd4, and the Abbe number of fifth lens element 7 is vd5. In an embodiment, they satisfy the following relations:

$$20 < vd1 - vd2 \qquad (6)$$

$$0 \leq |vd3 - vd2| \leq 5 \qquad (7)$$

$$20 < vd4 - vd3 \qquad (8)$$

$$0 \leq |vd4 - vd5| \leq 5 \qquad (9)$$

In an embodiment, vd1 is greater than 50, and preferably greater than 55; vd2 and vd3 can be in the range between 20 and 28, and vd4 and vd5 can be in the range between 51 and 57. In some embodiments, the difference between vd2 and vd3 may have an absolute value between 0 and 5. In other words, vd2 and vd3 may have the same Abbe number, or vd2 may have an Abbe number higher than that of vd3, or vd2 may have an Abbe number smaller than that of vd3 so that the absolute difference between them falls in the range between 0 and 5. Similarly, the absolute difference between vd4 and vd5 fall in the range between 0 and 5.

In a preferred embodiment, vd1 is 56.11, vd2 and vd3 each are 23.34, vd4 and vd5 each are 55.70 to satisfy the following conditions:

$$30 < vd1 - vd2 \qquad (6a)$$

$$|vd3 - vd2| = 0 \qquad (7a)$$

$$30 < vd4 - vd3 \qquad (8a)$$

$$|vd4 - vd5| = 0 \qquad (9a)$$

Optimizing air gaps between the lens elements and optical filter may minimize aberrations. In a preferred embodiment, the ratio between the sum of all air gaps from the imaging-side surface of the first lens element to the object-side surface of the optical filter and the total track length (TTL) is less than 0.4 in order for the lens system to be able to focus from infinity to portrait distances. In order words, the lens system 200 satisfies the following condition:

$$(\Sigma(\text{air gaps}))/TTL < 0.4 \qquad (10)$$

where Σ(air gaps) is the sum of all air gaps from the imaging-side surface of the first lens element to the object-side surface of the optical lens and TTL is the total track length of the lens system. In some embodiments, the upper limit in condition (10) may be less than 0.4 such as less than 0.35 or preferably less than 0.3 to obtain a compact design of the lens system.

Similarly, air gaps between the lens elements may minimize aberrations. In some embodiments, the ratio between the sum of all air gaps between lens elements and the total track length (TTL) is less than 0.25 in order for the lens system to be able to focus from infinity to 10 cm. In a preferred embodiment, the sum of the air gaps from the imaging-side surface of the first lens element to the object-side surface of the fifth lens element is about 0.749 mm. The ratio of the sum of the air gaps between the lens elements to the total track length is about 0.25 or less, or preferably about 0.2 or less.

Further, the average diameter of each of the lens elements is related to its thickness as follows:

$$2.0 < d1\text{avg}/t1 < 3.0; \qquad (11a)$$

$$4.0 < d2\text{avg}/t2 < 6.0 \qquad (11b)$$

$$2.0 < d3\text{avg}/t3 < 5.0 \qquad (11c)$$

$$4.0 < d4\text{avg}/t4 < 7.0 \qquad (11d)$$

$$7.0 < d5\text{avg}/t5 < 11.0 \qquad (11e)$$

wherein t1, t2, t3, t4, and t5 are the respective thickness of the first, second, third, fourth, and fifth lens elements, and d1avg, d2avg, d3avg, d4avg and d5avg are the respective average diameters of the first, second, third, fourth and fifth lens elements. (As noted above, the average diameter is the sum of the object-side diameter and the imaging-side diameter of a lens element, divided by two.)

Figure 4A:
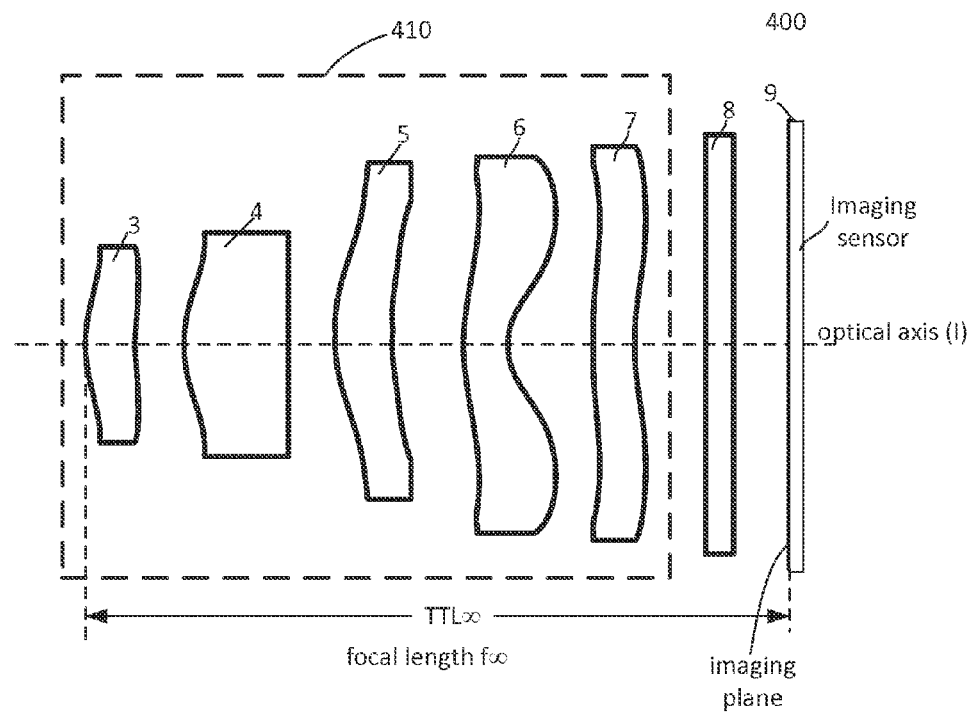
FIGS. 4A and 4B are cross-sectional views illustrating different total track lengths of a lens system for explaining the lens system's operations.
Figure 4B:
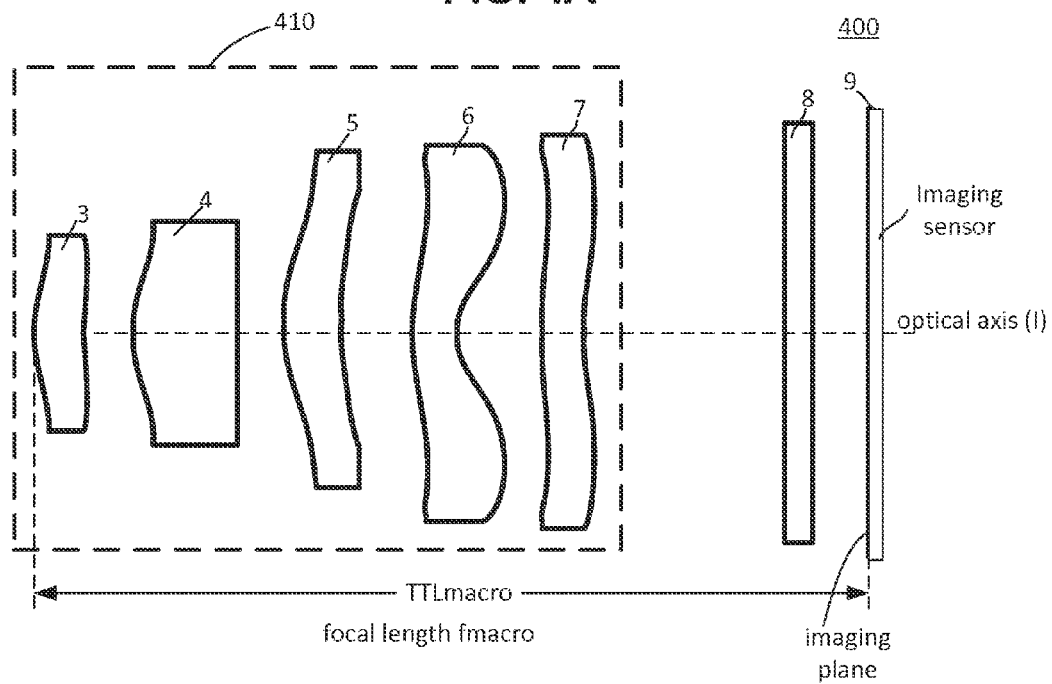

FIGS. 4A and 4B are cross-sectional views showing a lens system having variable total track lengths for explaining the lens operations. As shown in FIG. 4A, lens system 400 includes a lens arrangement 410 that comprises first, second, third, fourth, and fifth lens elements 3, 4, 5, 6, and 7. Lens system 400 may include an optical filter 8 that is disposed between lens arrangement 410 and an imaging sensor 9. Lens elements 3, 4, 5, 6, and 7 and optical filter 8 may have characteristics and optical performance described above in connection with FIGS. 2 and 3. In some embodiments, the diameters of the first and second lens elements may have a similar size. The diameters of the third lens element may be greater than the diameters of the first and second lens elements. The diameters of the fourth lens element may be greater than the diameters of the third lens element. The diameters of the fifth lens element may be greater than the diameters of the fourth lens element. And the active diameter of the optical filter may be greater than the diameters of the fifth lens elements.

In an embodiment, lens arrangement 410 may include a holding member (not shown) configured to hold lens elements 3, 4, 5, 6, and 7. The holding member may have a cylindrical shape having a plurality of grooves in the inside surface area to hold the lens elements by their flanges.

Lens arrangement 410 may be moveable along the optical axis toward and away from the imaging sensor. In some embodiments, lens arrangement 410 may include optical filter 8. In this case, the air gaps between the lens elements and optical filter remain constant and the air gap between the optical filter and the imaging plane of imaging sensor 9 may vary depending on the position of the lens arrangement. In other embodiments, optical filter 8 may not be part of lens arrangement 410 so that the air gap between optical lens 8 and the imaging plane of imaging sensor 9 remain constant while lens arrangement 410 moves toward and away from the imaging sensor, as shown in FIG. 4A and FIG. 4B. It should be noted that the FIG. 4A and FIG. 4B are merely examples. A person skilled in the art will appreciate that other embodiments can be within the claimed subject matter. In the following description, lens arrangement 410 may or may not include optical filter 8. For example, in case where lens arrangement 410 includes optical filter 8, air gap s5 between the imaging-side surface of fifth lens element 7 and optical lens 8 is constant while the lens arrangement moves along the optical axis relative to the imaging plane. In other words, optical lens 8 may be mounted to the holding member together with the lens elements.

To the extent that the focal length of lens arrangement 410 varies with distance to the object, moving lens arrangement 410 along the optical axis allows lens arrangement 410 to focus images of objects at different distances onto imaging sensor 9 at different times, providing variable focus. For example, in the embodiment shown, the focal length of lens arrangement 410 for an object at an infinite distance (or an effectively infinite distance, such as 10 m), denoted $f_\infty$, is shorter than the focal length of lens arrangement 410 for an object located in close proximity (e.g., 10 cm), denoted $f_{macro}$. Accordingly, when an object at infinity is to be imaged, it is desirable to move lens arrangement 410 closer to imaging sensor 9, and when an object in close proximity is to be imaged, it is desirable to move lens arrangement 410 farther from imaging sensor 9.

The holding member holding lens arrangement 410 can be movable along the optical axis within a limited range of motion. Moving lens arrangement 410 closer to imaging sensor 9 to get infinity focus results in shorter TTL, and moving farther away from imaging sensor 9 to get macro focus results in longer TTL. Thus, lens arrangement 410 may reach a closest position relative to the optical center of imaging sensor 9. The closest position between the lens arrangement and the imaging sensor provides the shortest total track length. The shortest total track length (TTL) allows an object located at a very long distance (e.g., at infinity) from the optical center of lens system 400 to be displayed on the focal plane on the imaging sensor. The shortest TTL is termed herein as $TTL_\infty$ and is shown in FIG. 4A.

Likewise, lens arrangement 410 may also reach a farthest position relative to the optical center of imaging sensor 9. The farthest position between the lens arrangement and the imaging sensor provides the longest total track length. The longest total track length (TTL) allows an object located at a very short distance (e.g., at a macro level) from the optical center of lens system 400 to be displayed on the focal plane on the imaging sensor. The longest TTL is termed herein as $TTL_{macro}$ and is shown in FIG. 4B. In an embodiment, the shortest or close-up distance (macro) of the object from the optical center of imaging sensor can be 10 cm.

Lens system 400 can have variable focusing distance by changing the position of the lens arrangement in relation to the imaging sensor. In other words, the focus of lens system 400 can be varied by placing lens arrangement 410 at any positions between the two extremities corresponding to $TTL_\infty$ and $TTL_{macro}$. In an embodiment, the ratio of $TTL_\infty$ to $TTL_{macro}$ is proportional to the ratio of focal length at the farthest extremity $f_\infty$ to focal length at the closest extremity $f_{macro}$ (e.g., at 10 cm). Lens system 400 with variable focus satisfies the following conditions:

$$TTL_\infty/TTL_{macro} \sim f_\infty/f_{macro} \quad (12)$$

where the symbol "~" means "is proportional to," "$f_\infty$" designates the focal length of lens system 400 at the closest extremity (as shown in FIG. 4A) when an object of focus at an infinite distance from the optical center of imaging sensor 9 is in an in-focus state, and "$f_{macro}$" designates the focal length of lens system 400 at the farthest extremity (as shown in FIG. 4B) when a close-up object from the optical center of the imaging sensor is in an in-focus state, $TTL_\infty$ is the total track length of lens system 400 when an object of focus is at an effectively infinite distance from the optical center of imaging sensor 9, and $TTL_{macro}$ is the total track length when the object of focus is at a close-up range from the optical center of imaging sensor 9. As shown in FIGS. 4A and 4B, the total track length $TTL_\infty$ is shorter than the total track length $TTL_{macro}$.

In an embodiment, the nominal total track length is about 3.91 mm, the minimum total track length (i.e., total track length of the lens system where the object of focus is at an infinite distance from the optical center of imaging sensor 9) is about 3.852 mm, and the maximum total track length (i.e., total track length where the object of focus is about 10 cm from the optical center of imaging sensor 9) is about 3.965 mm. In an embodiment, the ratio between the minimum TTL ($TTL_\infty$) and the maximum TTL ($TTL_{macro}$) is 0.99 or less, preferably 0.98 or less, more preferably from 0.965 to 0.975, to provide a compact lens system.

Figure 5:
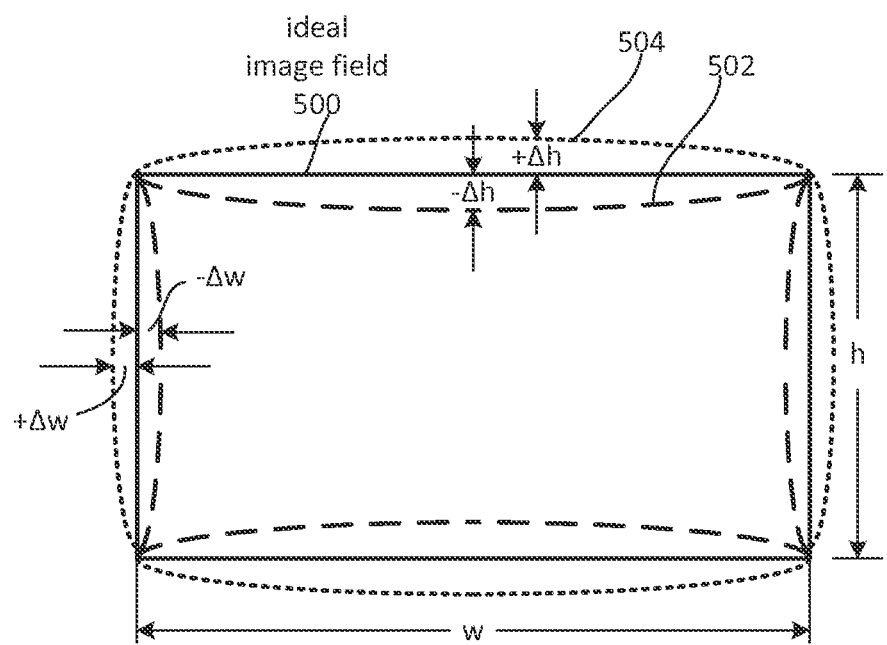
FIG. 5 is a schematic diagram illustrating TV distortion of an imaging lens system.

FIG. 5 is a schematic diagram illustrating TV distortion of an imaging lens system. TV distortion causes deviation from an ideal rectangular image field 500, which can occur as an inward distortion 502 or outward distortion 504. A TV distortion can be expressed with the following equation:

$$TV\ distortion(height) = \pm \Delta h/h \quad (13a)$$

$$TV\ distortion(width) = \pm \Delta w/w \quad (13b)$$

where TV distortion (height) is the distortion along the vertical height of the image field, TV distortion (width) is the distortion along the longitudinal length or width of the image field, h is the vertical height of the image field, Δh is the maximum deviation in the direction of the vertical height, w is the longitudinal length or width of the image field, and Δw is the maximum deviation in the direction of the longitudinal length of the image field.

In some embodiments, an imaging lens system as described herein may have performance of astigmatism and distortion aberrations that meet certain target characteristics. Images taken with an imaging lens system disclosed above can be viewed on a TV screen with a vertical or longitudinal TV distortion of less than ±1 percent.

Figure 6:
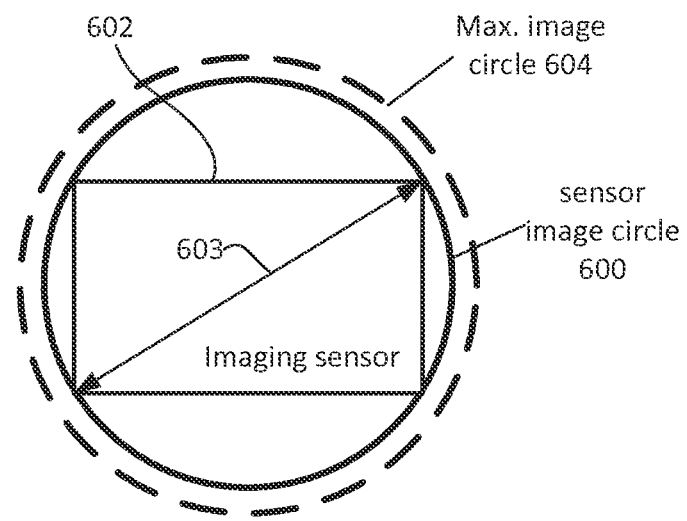
FIG. 6 is a schematic diagram illustrating a relationship between an imaging sensor, an associated image sensor circle and a maximum image circle according to an embodiment of the present invention.

FIG. 6 shows a relation between a semiconductor imaging sensor (e.g., a CMOS imaging sensor), the associated sensor image circle and the maximum image circle according to an embodiment of the present invention. The sensor image circle (SIC) can be defined as a circle 600 that circumscribes a rectangular imaging sensor 602. In other words, the diameter of sensor image circle 600 is equal to a diagonal size 603 of rectangular imaging sensor 602. The maximum image circle for a lens system can be defined as a circle 604 that corresponds to a circular area in the imaging plane over which the lens produces acceptable image quality. In some embodiments, the ratio between the sensor image circle and the maximum image circle is greater than 0.9. For example, the imaging sensor may have a diagonal of about 4.534 mm, so that the sensor image circle also has a diameter of 4.536 mm, and the maximum image circle has a diameter of 4.736 mm. In an embodiment, the lens system has a chief ray angle of less than 31° and a relative illumination at full field diagonal image height greater than 40 percent. Embodiments of the present invention provide a compact lens system according to the following inequity:

$$DM/TTL \geq 1.0 \quad (14)$$

where DM is the diameter of the sensor image circle and TTL is the total track length. For example, the sensor image circle can have a diameter of 4.536 mm and the total track length can be 3.90 mm in one embodiment.

In some embodiments, illumination of the surface area of the imaging sensor may depend on performance characteristics of an associated lens system. In general, an optical lens system may not illuminate the imaging sensor uniformly even when a uniform illuminating light is applied to it. A lens system may only partially pass through light that irradiates the lens system at a certain angle of incidence. The lens system may completely pass light that is substantially normal to the optical axis. As a result, the imaging sensor may receive more light in the center than around the edges. Therefore, a relative illumination may be used to characterize the optical performance of a lens system. The relative illumination can be defined as a percentage of a maximum illumination value. If the maximum illumination value of a surface region (e.g., the center) of the imaging sensor is 1.0 or 100%, the relative illumination values may decrease when moving away from the center of the imaging sensor. In an embodiment, the lens system 200 or 300 as shown in FIG. 2 or 3 may provide a relative illumination value greater than 40.0 percent across the diagonal of the imaging sensor.

While the invention has been described with respect to specific embodiments, one skilled in the art will recognize that variations and modifications are possible and that the invention is intended to cover all modifications and equivalents within the scope of the following claims.

What is claimed is:

1. An imaging lens comprising first, second, third, fourth, and fifth lens elements arranged in order from an object side to an imaging side, each of the first, second, third, fourth, and fifth lens elements having an object-side surface facing toward the object side, and an imaging-side surface facing toward the imaging side, wherein the imaging lens satisfies the following conditions:

$$20 < vd1 - vd2;$$

$$0 \leq |vd3 - vd2| \leq 5;$$

$$20 < vd4 - vd3;\ \text{and}$$

$$0 \leq |vd4 - vd5| \leq 5,$$

wherein vd1, vd2, vd3, vd4, and vd5 are Abbe numbers of the respective first, second, third, fourth, and fifth lens elements, |vd3−vd2| is the absolute value of the difference between vd2 and vd3, and |vd4−vd5| is the absolute value of the difference between vd4 and vd5; and
wherein the object-side surface of the fourth lens element satisfies the following condition:

$$7.0 < sag(75)/sag(25) < 14.0,$$

where sag(25) is a sag value at a 25 percent point of a clear aperture radius of the object-side surface and sag(75) is a sag value at a 75 percent point of the clear aperture radius of the object-side surface.

2. The imaging lens of claim 1, wherein the first lens element has a ratio of average diameter to thickness in a range between 2 and 3, and the second lens element has a ratio of average diameter to thickness in a range between 4 and 6.

3. The imaging lens of claim 1, wherein the first lens element has an average diameter that is equal to an average diameter of the second lens element.

4. The imaging lens of claim 1, wherein each of the third, fourth, and fifth lens elements has an imaging-side diameter that is greater than an object-side diameter by at least 0.3 mm.

5. The imaging lens of claim 1, wherein the fourth lens element has a ratio of average diameter to thickness in a range between 4 and 7, and the fifth lens element has a ratio of average diameter to thickness in a range between 7 and 11.

6. The imaging lens of claim 1, wherein the object-side surface and the imaging-side surface of the first, second, third, and fourth lens elements are coated with an anti-reflective coating.

7. A lens system operable to operate in conjunction with an imaging sensor, the lens system comprising in order from an object side to an imaging side:
an aperture stop configured to pass light, the aperture stop having a circular-shaped opening in the center;
a first lens element having an object-side diameter and an imaging-side diameter;
a second lens element having an object-side diameter and an imaging-side diameter;
a third lens element having an object-side diameter and an imaging-side diameter;
a fourth lens element having an object-side diameter and an imaging-side diameter; and a fifth lens element having an object-side diameter and an imaging-side diameter, wherein the circular-shaped opening has a diameter smaller than the object-side diameter of the first lens element, wherein a difference between a first Abbe number of the first lens element and a second Abbe number of the second lens element is greater than 20, and an absolute value of a difference between a third Abbe number of the third lens element and the second Abbe number of the second lens element falls in a range between 0 and 5, wherein the lens system further satisfies the following conditions:

$$0<s2/s1<5.0;$$

$$0<s4/s3<0.7;\text{ and}$$

$$0<s3/s2<1.0,$$

wherein s1 is an air gap between the imaging-side surface of the first lens element and the object-side surface of the second lens element, s2 is an air gap between the imaging-side surface of the second lens element and the object-side surface of the third lens element, s3 is an air gap between the imaging-side surface of the third lens element and the object-side surface of the fourth lens element, s4 is an air gap between the imaging-side surface of the fourth lens element and the object-side surface of the fifth lens element; and wherein the first, second, third, fourth, and fifth lens elements are configured to focus images of objects located at distances ranging from 10 cm to infinity from the lens system by moving all of the lens elements from a first location to a second location in relation to the imaging sensor, while holding all of the lens elements in fixed relation to each other.

8. The lens system of claim 7 further comprising an optical filter disposed between the fifth lens element- and the imaging sensor and configured to suppress transmission of infrared light.

9. The lens system of claim 8, wherein the optical filter has a thickness of about 0.3 mm.

10. The lens system of claim 8, wherein the imaging sensor is disposed at a distance between about 0.3 mm and about 0.4 mm from the optical filter.

11. The lens system of claim 8, wherein the first, second, third, fourth, fifth lens elements, and the optical filter have air gaps therebetween and a ratio of a sum of the air gaps to a total track length is about 0.4 or less.

12. The lens system of claim 7, wherein the object-side diameter of each lens element is equal to or smaller than its imaging-side diameter.

13. The lens system of claim 7, wherein a ratio between a sag at 75 percent point and a sag at 25 percent point of the object-side surface of the fourth lens element is in a range from 7 to 14.

14. The lens system of claim 7, further comprising a holding member configured to hold the first, second, third, fourth, and fifth lens elements.

15. The lens system of claim 7 wherein the lens system has a maximum chief ray angle (CRA) smaller than 31 degrees.

16. The lens system of claim 7 wherein the lens system has a TV distortion less than ±1.0 percent.

17. The lens system of claim 7 wherein the lens system has a sensor image circle having a diameter of about 4.536 mm.

18. An imaging lens system comprising first, second, third, fourth, fifth lens elements, an optical filter, and an imaging sensor arranged sequentially in order from an object side to an imaging side, wherein:

the first lens element has an object-side surface and an imaging-side surface and a thickness along an optical axis of 0.49 mm;

the second lens element has an object-side surface and an imaging-side surface and a thickness along the optical axis of 0.27 mm;

the third lens element has an object-side surface and an imaging-side surface and a thickness along the optical axis of 0.465 mm;

the fourth lens element has an object-side surface and an imaging-side surface and a thickness along the optical axis of 0.4 mm;

the fifth lens element has an object-side surface and an imaging-side surface and a thickness along the optical axis of 0.35 mm; and the optical filter has a thickness along the optical axis of 0.3 mm.

19. The lens system of claim 18, wherein:

the imaging-side surface of the first lens element and the object-side surface of the second lens element have an air gap along the optical axis of 0.07 mm;

the imaging-side surface of the second lens element and the object-side surface of the third lens element have an air gap along the optical axis of 0.288 mm;

the imaging-side surface of the third lens element and the object-side surface of the fourth lens element have an air gap along the optical axis of 0.26 mm;

the imaging-side surface of the fourth lens element and the object-side surface of the fifth lens element have an air gap along the optical axis of 0.13 mm, and the imaging-side surface of the fifth lens element and the object-side surface of the optical filter have an air gap along the optical axis of 0.441 mm.

20. The lens system of claim 18, wherein the first lens element has a first Abbe number vd1, the second lens element has a second Abbe number vd2, the third lens element has a third Abbe number vd3, the fourth lens element has a fourth Abbe number vd4, and the fifth lens element has a fifth Abbe number vd5, wherein the Abbe numbers satisfy the following conditions:

$$20<vd1-vd2;$$

$$0 \leq |vd3-vd2| \leq 5;$$

$$20<vd4-vd3;\text{ and}$$

$$0 \leq |vd4-vd5| \leq 5,$$

wherein |vd3−vd2| is the absolute value of the difference between vd2 and vd3, and |vd4−vd5| is tan absolute value of a difference between vd4 and vd5.

21. The lens system of claim 18 further satisfying the following condition:

$$DM/TTL \geq 1.0$$

wherein DM is a diameter of a sensor image circle and TTL is a total track length of the lens system.

22. The lens system of claim 18, wherein the lens system provides a relative illumination greater than 40.0 percent across a full diagonal size of an imaging sensor.

23. The lens system of claim 18 further satisfying the following conditions:

$$TTL_\infty TTL_{macro} = f_\infty / f_{macro},\text{ and}$$

$$0.96<TTL_\infty/TTL_{macro}<0.98,$$

where $TTL_\infty$ is a total track length of the lens system when an object of focus is at an effectively infinite distance from the optical center of the imaging sensor, $TTL_{macro}$ is a total track length when the object of focus is at a close-up range from the optical center of the imaging sensor, $f_\infty$ is a focal length of the lens system when an object at an effectively infinite distance from the optical center of the imaging sensor is in an in-focus state, and $f_{macro}$ is the focal length of the lens system at the farthest extremity when a close-up object from the optical center of the imaging sensor is in the in-focus state.

24. The lens system of claim 23, wherein the close-up range is about 10 cm.

* * * * *